United States Patent
Ichikawa et al.

(10) Patent No.: US 10,260,892 B2
(45) Date of Patent: Apr. 16, 2019

(54) DATA STRUCTURE OF ENVIRONMENT MAP, ENVIRONMENT MAP PREPARING SYSTEM AND METHOD, AND ENVIRONMENT MAP UPDATING SYSTEM AND METHOD

(71) Applicant: TOYOTA JIDOSHA KABUSHIKI KAISHA, Toyota-shi (JP)

(72) Inventors: Kentaro Ichikawa, Shizuoka-ken (JP); Hiromitsu Urano, Numazu (JP); Taisuke Sugaiwa, Susono (JP); Maiko Hirano, Susono (JP); Bunyo Okumura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 42 days.

(21) Appl. No.: 15/486,828

(22) Filed: Apr. 13, 2017

(65) Prior Publication Data
US 2017/0299397 A1 Oct. 19, 2017

(30) Foreign Application Priority Data

Apr. 19, 2016 (JP) .................................. 2016-083719

(51) Int. Cl.
| | | |
|---|---|---|
| *G01C 21/34* | (2006.01) | |
| *B60R 11/04* | (2006.01) | |
| *G01C 21/36* | (2006.01) | |
| *G05D 1/02* | (2006.01) | |
| *G06F 17/30* | (2006.01) | |
| *G01C 21/32* | (2006.01) | |
| *G01S 19/13* | (2010.01) | |

(52) U.S. Cl.
CPC .............. *G01C 21/34* (2013.01); *B60R 11/04* (2013.01); *G01C 21/32* (2013.01); *G01C 21/36* (2013.01); *G05D 1/0212* (2013.01); *G05D 1/0274* (2013.01); *G06F 17/30241* (2013.01); *G06F 17/30377* (2013.01); *B60R 2300/107* (2013.01); *G01S 19/13* (2013.01); *G05D 1/0236* (2013.01); *G05D 1/0257* (2013.01)

(58) Field of Classification Search
CPC ........ G01C 21/32; G01C 21/34; G01C 21/36; B60R 11/04; B60R 2300/107; G01S 19/13; G06F 17/30241; G06F 17/30377; G05D 1/0212; G05D 1/0274; G05D 1/0236; G05D 1/0257
See application file for complete search history.

(56) References Cited

U.S. PATENT DOCUMENTS

2008/0071466 A1 3/2008 Downs et al.

FOREIGN PATENT DOCUMENTS

| JP | 2003-345438 A | 12/2003 |
|---|---|---|
| JP | 2014-089740 A | 5/2014 |

*Primary Examiner* — Calvin Cheung
(74) *Attorney, Agent, or Firm* — Sughrue Mion, PLLC

(57) ABSTRACT

A data structure of an environment map includes: position information indicating a position in a space; and a state quantity variability of the position. The state quantity variability is correlated with the position information, and the state quantity variability indicates a variation tendency of a state quantity of the position with respect to time.

15 Claims, 18 Drawing Sheets

DATA STRUCTURE OF ENVIRONMENT MAP, ENVIRONMENT MAP PREPARING SYSTEM AND METHOD, AND ENVIRONMENT MAP UPDATING SYSTEM AND METHOD

INCORPORATION BY REFERENCE

The disclosure of Japanese Patent Application No. 2016-083719 filed on Apr. 19, 2016 including the specification, drawings and abstract is incorporated herein by reference in its entirety.

BACKGROUND

1. Technical Field

The disclosure relates to a data structure of an environment map, an environment map preparing system and method, and an environment map updating system and method.

2. Description of Related Art

A mobile robot that stores map information including information of the position and size of an obstacle such as a piece of furniture in a room, determines a moving route for moving from a current position to a destination while avoiding the piece of furniture using the map information, and moves in the room along the moving route is known (see Japanese Patent Application Publication No. 2003-345438 A (JP 2003-345438 A)).

When the obstacle in the room is a static obstacle of which the position rarely changes such as a bed and the map information includes information of the position and the size of the obstacle, the mobile robot may move while avoiding the obstacle. However, when the obstacle is a static obstacle of which the position changes relatively frequently such as a chair or a trashcan and the static obstacle is located at a certain position at a certain time, the possibility of the static obstacle being at the certain position at another time is low and the possibility of the static obstacle being at a position other than the certain position is high. When the obstacle is a dynamic obstacle such as a person or a pet, the possibility of the position changing is even higher.

The map in JP 2003-345438 A merely includes information on the position and size of an obstacle at the time at which the map information is prepared. Accordingly, in JP 2003-345438 A, the position of an obstacle which changes with the lapse of time, that is, the situation in the room, may not be accurately ascertained. In other words, when the map information merely includes the information on the position and the size of the obstacle, it is difficult to accurately ascertain a situation in a space in which the mobile robot moves.

SUMMARY

The disclosure provides map information that can accurately express a situation in a space.

A first aspect of the disclosure provides a data structure of an environment map. The data structure of the environment map includes position information indicating a position in a space, and a state quantity variability of the position. The state quantity variability is correlated with the position information, and the state quantity variability indicates a variation tendency of a state quantity of the position with respect to time.

In the first aspect of the disclosure, the data structure of the environment map may include a state quantity representative value of the position. The state quantity representative value may be calculated based on the state quantity and correlated with the position information.

In the first aspect of the disclosure, the data structure of the environment map may include a newest detection time. The state quantity variability may be calculated based on the state quantity, and the newest detection time may be newest among detection times of the state quantity. The detection times of the state quantity may be used to calculate the state quantity variability. The newest detection time may be correlated with the state quantity variability.

In the first aspect of the disclosure, the state quantity of the position may be expressed by a presence probability of an object at the position.

A second aspect of the disclosure provides an environment map preparing system. The environment map preparing system includes a detector configured to detect position information indicating a position in a space and a state quantity of the position, an environment map storage unit, and an electronic control unit. The electronic control unit is configured to cause the detector to detect the position information and the state quantity of the position at different times for the position in the space, calculate a state quantity variability indicating a variation tendency of the state quantity with respect to time using the quantity for the position, and store the state quantity variability in correlation with the position information of a corresponding position in the environment map storage unit.

In the second aspect of the disclosure, the electronic control unit may be configured to calculate a state quantity representative value based on the state quantity for the position and store the state quantity representative value in correlation with the position information of the corresponding position in the environment map storage unit.

In the second aspect of the disclosure, the electronic control unit may be configured to calculate a variation of the state quantity per unit time for the position, and calculate the state quantity variability based on the variation of the state quantity per unit time.

In the second aspect of the disclosure, the state quantity of the position may be expressed by a presence probability of an object at the position.

A third aspect of the disclosure provides an environment map preparing method. The environment map preparing method includes detecting position information indicating a position in a space and a state quantity of the position at different times for the position in the space, calculating a state quantity variability indicating a variation tendency of the state quantity with respect to time using the state quantity for the position, and storing the state quantity variability in correlation with the position information of a corresponding position in an environment map storage unit.

In the third aspect of the disclosure, the environment map preparing method may include calculating a state quantity representative value based on the state quantity for the position, and storing the state quantity representative value in correlation with the position information of the corresponding position in the environment map storage unit.

In the third aspect of the disclosure, the environment map preparing system may include calculating a variation of the state quantity per unit time for the position. And the calculating of the state quantity variability may include calculating the state quantity variability based on the variation of the state quantity per unit time.

In the third aspect of the disclosure, the state quantity of the position may be expressed by a presence probability of an object at the position.

A fourth aspect of the disclosure provides an environment map updating system. The environment map updating system includes an update target environment map storage unit, a detector, an updated environment map storage unit, and an electronic control unit. The update target environment map storage unit configured to store update target environment map information. The update target environment map information includes first position information indicating a position in a space and a first state quantity variability of the position correlated with the first position information. The first state quantity variability indicates a first variation tendency of a state quantity of the position with respect to time. The detector is configured to detect the first position information and the first state quantity of the position. The electronic control unit is configured to newly detect a second position information indicating the position and a second state quantity of the position at different time, newly calculate a second state quantity variability by using the second state quantity for the position, update the first state quantity variability of the update target environment map information by using the second position information and the second state quantity variability, and store the updated first state quantity variability in correlation with the second position information in the updated environment map storage unit.

In the fourth aspect of the disclosure, the update target environment map information may include a first state quantity representative value of the position correlated with the first position information. The electronic control unit may be configured to newly calculate a second state quantity representative value based on the second state quantity for the position, update the first state quantity representative value of the update target environment map information by using the second position information and the second state quantity representative value, and store the updated first state quantity representative value in correlation with the second position information in the updated environment map storage unit.

In the fourth aspect of the disclosure, the electronic control unit may be configured to newly calculate a variation of a state quantity per unit time for the position, and newly calculate a state quantity variability based on the variation of the state quantity per unit time.

In the fourth aspect of the disclosure, a state quantity of the position may be expressed by a presence probability of an object at the position.

A fifth aspect of the disclosure provides an environment map updating method. The environment map updating method includes preparing update target environment map information, newly detecting a second position information indicating the position and a second state quantity of the position at different time, newly calculating a second state quantity variability by using the second state quantity for the position, updating the first state quantity variability of the update target environment map information by using the second position information and the second state quantity variability, and storing the updated first state quantity variability in correlation with the second position information in an updated environment map storage unit. The update target environment map information includes first position information indicating a position in a space and a first state quantity variability of the position correlated with the first position information. The first state quantity variability indicates a first variation tendency of a state quantity of the position with respect to time.

In the fifth aspect of the disclosure, the environment map updating method may include newly calculating a second state quantity representative value based on the second state quantity for the position, updating a first state quantity representative value of the update target environment map information by using the second position information and the second state quantity representative value, and storing the updated first state quantity representative value in correlation with the second position information in the updated environment map storage unit. The update target environment map information may include the first state quantity representative value, and the state quantity representative value may be correlated with the first position information.

In the fifth aspect of the disclosure, the environment map updating method may include newly calculating a variation of a state quantity per unit time for the position, and newly calculating a state quantity variability based on the variation of the state quantity per unit time.

In the fifth aspect of the disclosure, a state quantity of the position may be expressed by a presence probability of an object at the position.

According to the data structure of an environment map, the environment map preparing system and method, and the environment map updating system and method disclosed in the disclosure, it is possible to provide map information that can accurately express a situation in a space.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
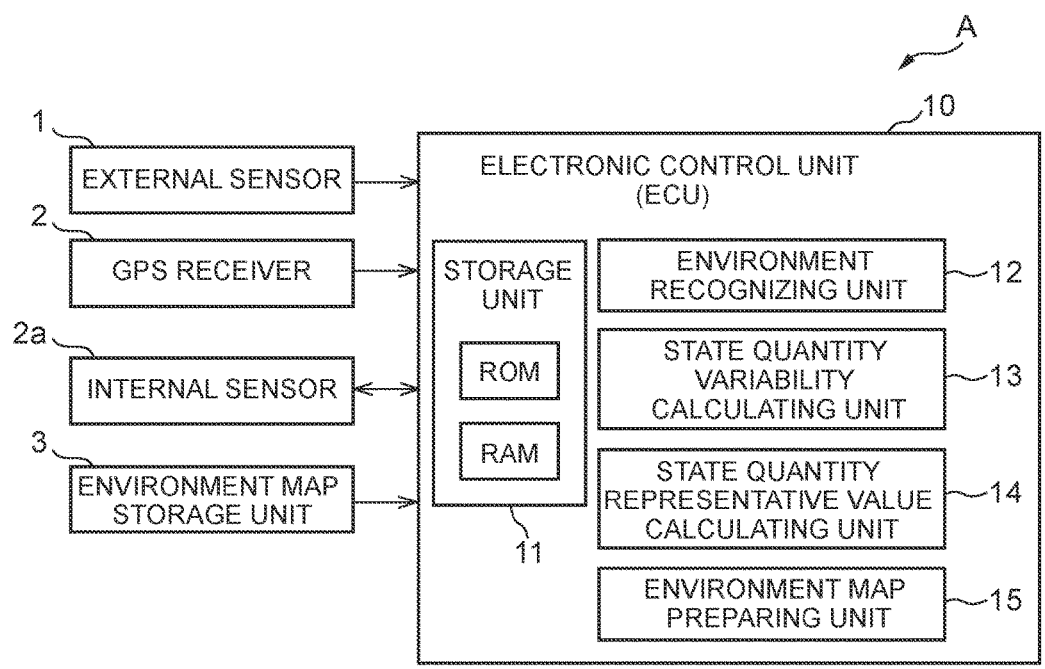
FIG. 1 is a block diagram illustrating an environment map preparing system according to a first embodiment of the disclosure.

FIG. 1 is a block diagram illustrating an environment map preparing system A according to a first embodiment of the disclosure. In the first embodiment of the disclosure, the environment map preparing system A is mounted on a mobile object having an automatic driving function. Examples of the mobile object include a vehicle or a mobile robot. In the following description, it is assumed that the mobile object is a vehicle. Referring to FIG. 1, the environment map preparing system A includes an external sensor 1, a GPS receiver 2, an internal sensor 2a, an environment map storage unit 3, and an electronic control unit 10.

The external sensor 1 is a detection device that detects information on the outside or the surroundings of the vehicle. The external sensor 1 includes at least one of a laser imaging detection and ranging (LIDAR), a radar, and a camera. In the first embodiment of the disclosure, as illustrated in FIG. 2, the external sensor 1 includes at least one LIDAR SO1, at least one radar SO2, and at least one camera SO3.

The LIDAR SO1 is a device that detects an object outside the vehicle V using a laser beam. In the first embodiment of the disclosure, examples of the object include a static object which is an immovable object (such as a building or a road), a dynamic object which is a movable object (such as another vehicle or a pedestrian), a quasi-static object which is an object that is basically immovable but can be easily moved (such as a standing signboard, a trashcan, or a tree branch).

Figure 2:
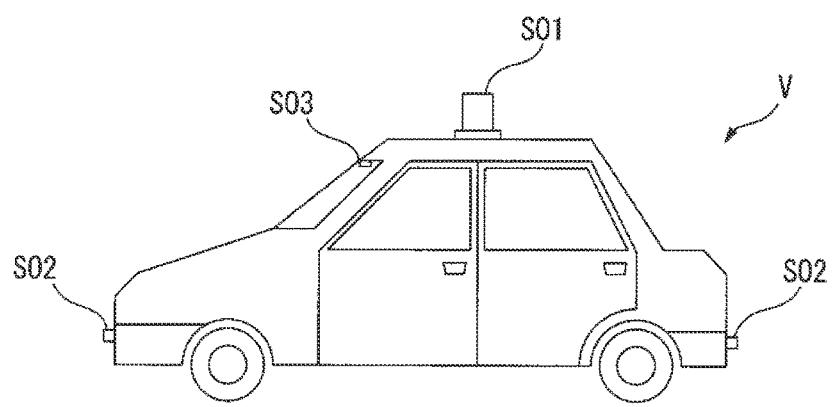
FIG. 2 is a schematic diagram illustrating an external sensor.

In the example illustrated in FIG. 2, a single LIDAR SO1 is installed on the roof of the vehicle V. In another embodiment (not illustrated), for example four LIDARs are attached to bumpers at four corners of the vehicle V. The LIDARs SO1 sequentially emit laser beams in all directions from the vehicle V and measure information on objects from the reflected beams thereof. The object information includes a distance and a direction from the corresponding LIDAR SO1 to the object, that is, a relative position of the object to the LIDAR SO1. The object information detected by the LIDARs SO1 is transmitted to the electronic control unit 10. On the other hand, the radar SO2 is a device that detects an object outside the vehicle V using radio waves. In the example illustrated in FIG. 2, for example four radars SO2 are attached to the bumpers at four corners of the vehicle V. The radars SO2 emit radio waves from the radars SO2 in all directions from the vehicle V and measure information on an object near the vehicle V from reflected waves thereof. The object information detected by the radar SO2 is transmitted to the electronic control unit 10. In the example illustrated in FIG. 2, the camera SO3 includes a single stereo camera installed inside a front glass of the vehicle V. The stereo camera SO3 photographs the front side of the vehicle V in a color or monochrome manner and the color or monochrome photographing information from the stereo camera SO3 is transmitted to the electronic control unit 10.

Referring to FIG. 1 again, the GPS receiver 2 receives signals from three or more GPS satellites and detects information indicating an absolute position of the vehicle or the external sensor 1 (for example, latitude, longitude, and altitude of the vehicle V) therefrom. The absolute position information of the vehicle detected by the GPS receiver 2 is transmitted to the electronic control unit 10. In another embodiment (not illustrated), the absolute position detected on the basis of the signals from the GPS satellites is corrected and an absolute value having higher accuracy is acquired. That is, the absolute position detected on the basis of the signals from the GPS satellites is corrected, for example, on the basis of a difference between the external information detected by the external sensor 1 and external information stored in advance.

The internal sensor 2a is a detection device that detects a travel condition of the vehicle V. The travel condition of the vehicle V is expressed by at least one of a speed, an acceleration, and a posture of the vehicle. The internal sensor 2a includes one or both of a vehicle speed sensor and an inertial measurement unit (IMU). The vehicle speed sensor detects the speed of the vehicle V. The IMU includes, for example, a three-axis gyro and a three-direction acceleration sensor, detects three-dimensional angular velocity and acceleration of the vehicle V, and detects the acceleration and the posture of the vehicle V on the basis thereof. The travel condition information of the vehicle V detected by the internal sensor 2a is transmitted to the electronic control unit 10.

The environment map storage unit 3 stores environment map information.

The electronic control unit 10 is a computer including a central processing unit (CPU), a read only memory (ROM), and a random access memory (RAM) which are connected to one another by bidirectional buses. As illustrated in FIG. 1, the electronic control unit 10 according to the first embodiment of the disclosure includes a storage unit 11 including the ROM and the RAM, an environment recognizing unit 12, a state quantity variability calculating unit 13, a state quantity representative value calculating unit 14, and an environment map preparing unit 15.

The environment recognizing unit 12 detects position information indicating a plurality of positions in a space around the vehicle V and state quantities of the positions. In the first embodiment of the disclosure, the above-mentioned space is a three-dimensional space. In another embodiment (not illustrated), the space may be a two-dimensional space. In the first embodiment of the disclosure, a state quantity of a certain position is expressed by a presence probability of an object at the certain position. In this case, the state quantity is calculated, for example, in the form of a continuous value from zero to 1. In another embodiment (not illustrated), the state quantity may be calculated in the form of a discrete value. In the first embodiment of the disclosure, the position information and the state quantity are calculated from object information from the external sensor 1 and the absolute position information of the vehicle V or the external sensor 1 from the GPS receiver 2. This will be described below with reference to FIG. 3.

Figure 3:
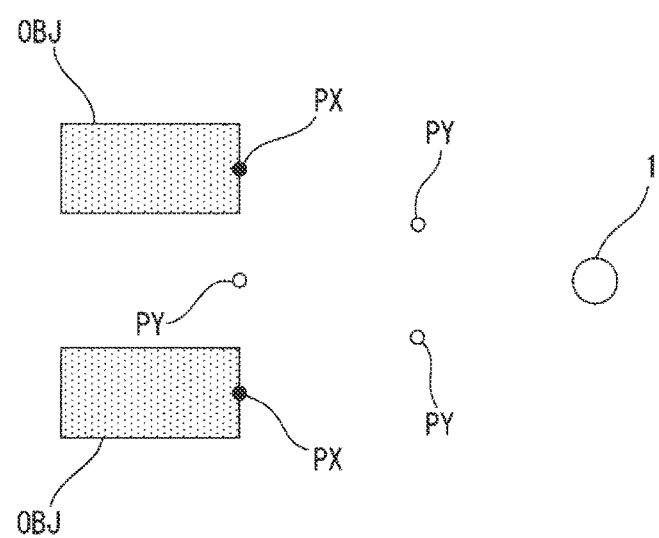
FIG. 3 is a schematic diagram illustrating a method of detecting position information and a state quantity.

FIG. 3 illustrates a case in which a laser beam emitted from the LIDAR serving as the external sensor 1 is reflected by an object OBJ. In this case, as indicated by a black circle in FIG. 3, a reflecting point is formed at a position PX. The LIDAR 1 measures relative position information of the position PX of the reflecting point. It can be seen from the measurement result that the object OBJ is present at the position PX, and thus the state quantity, that is, the object presence probability, of the position PX is 1.

The absolute position information of the position PX can be seen from the relative position information of the position PX from the LIDAR 1 and the absolute position information of the external sensor 1 from the GPS receiver 2. It can be seen that no object is present at a position PY which is not the reflecting point, and thus the state quantity, that is, the object presence probability, of the position PY is zero. The absolute position information of the position PY can be seen from the relative position information of the position PX from the LIDAR 1 and the absolute position information of the external sensor 1 from the GPS receiver 2. In this way, the absolute position information and the state quantities of the positions PX and PY are calculated.

Figure 4A:
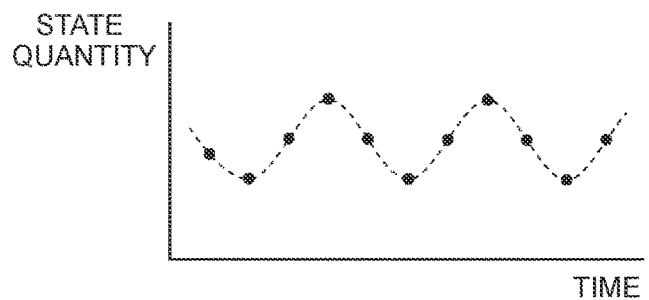
FIG. 4A is a diagram illustrating an example of a variation of a state quantity with respect to time.
Figure 4B:
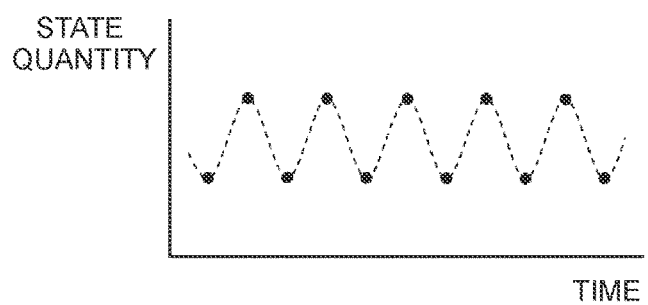
FIG. 4B is a diagram illustrating another example of the variation of the state quantity with respect to time.
Figure 4C:
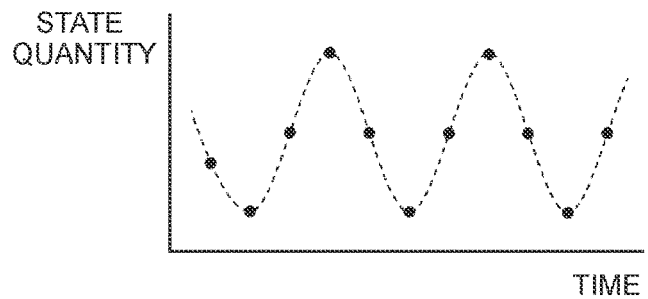
FIG. 4C is a diagram illustrating still another example of the variation of the state quantity with respect to time.

In the first embodiment of the disclosure, the external sensor 1 repeatedly detects object information, for example, at intervals of several tens of ms. In other words, the external sensor 1 detects the object information at a plurality of different times. Accordingly, the environment recognizing unit 12 calculates the state quantity at a plurality of different times from the object information at the plurality of different times. Alternatively, when the vehicle V moves to a predetermined position a plurality of times, the object information at a plurality of different times is also detected and the state quantity at a plurality of different times is also calculated. In FIGS. 4A, 4B, and 4C, various examples of the state quantity of a certain position at a plurality of different times are illustrated.

The state quantity variability calculating unit 13 calculates a state quantity variability for each of a plurality of positions. The state quantity variability of a certain position indicates a variation tendency of the state quantity of the certain position with respect to time. In the first embodiment of the disclosure, the state quantity variability is calculated in the form of a continuous value. In another embodiment (not illustrated), the state quantity variability is calculated in the form of a discrete value. The state quantity variability will be additionally described with reference to FIGS. 4A, 4B, and 4C. In FIGS. 4A, 4B, and 4C, detected state quantities are plotted.

The state quantity variability is expressed, for example, by a frequency of variation or a degree of variation of the state quantity with respect to time. That is, the state quantity in the example illustrated in FIG. 4B has a higher frequency of variation and a higher variation tendency with respect to time than the state quantity in the example illustrated in FIG. 4A. Accordingly, the state quantity variability in the example illustrated in FIG. 4B is higher than the state quantity variability in the example illustrated in FIG. 4A. On the other hand, the state quantity in the example illustrated in FIG. 4C has a higher frequency of variation and a higher variation tendency with respect to time than the state quantity in the example illustrated in FIG. 4A. Accordingly, the state quantity variability in the example illustrated in FIG. 4C is higher than the state quantity variability in the example illustrated in FIG. 4A.

Figure 5A:
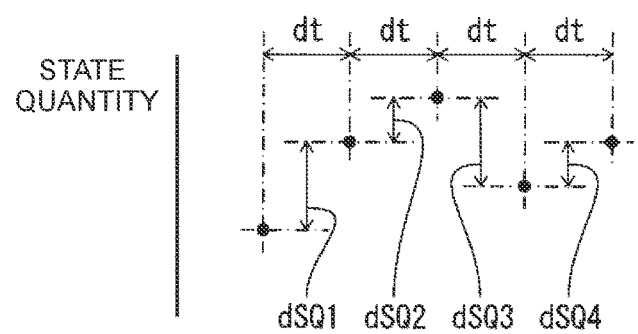
FIG. 5A is a timing chart illustrating a calculation example of a state quantity variability.

In the first embodiment of the disclosure, a variation of the state quantity per unit time is calculated and the state quantity variability is calculated on the basis of the variation of the state quantity per unit time. That is, in the example illustrated in FIG. 5A, variations (absolute values) dsQ1, dsQ2, . . . of the state quantity at the same time interval dt are calculated. In this case, the time interval dt is, for example, the same as the detection time interval of the state quantity. In the example illustrated in FIG. 5A, the variations dsQ1, dsQ2, . . . of the state quantity are calculated at the continuous time interval dt. In another embodiment, the variations of the state quantity may be calculated at discontinuous time intervals dt. Alternatively, in the example illustrated in FIG. 5B, variations (absolute values) dsQ1, dsQ2, . . . of the state quantity at a plurality of different time intervals dt1, dt2, . . . are calculated. The different time intervals are, for example, of an order of seconds, minutes, days, or years. Subsequently, variations per unit times dsQ1/dt1, dsQ2/dt2, . . . of the state quantity are sequentially calculated. In the example illustrated in FIG. 5B, the variations dsQ1, dsQ2, . . . of the state quantity are calculated at the continuous time intervals dt1, dt2, . . . In another embodiment, the variations of the state quantity may be calculated at discontinuous time intervals. Subsequently, the state quantity variability is calculated by simple-averaging or weighted-averaging the variations per unit times dsQ1/dt1, dsQ2/dt2, . . . of the state quantity. When the weighted average is used, for example, the variation per unit time dsQ/dt of the state quantity of which the detection time is newer is more weighted and the variation per unit time dsQ/dt of the state quantity of which the detection time is older is less weighted. In another embodiment, the variation per unit time dsQ/dt of the state quantity of which the detection time is newer is less weighted, and the variation per unit time dsQ/dt of the state quantity of which the detection time is older is more weighted. The state quantity variability is calculated for a plurality of positions.

In another embodiment (not illustrated), a plurality of state quantities as a function of time are Fourier-transformed and the state quantity variability is calculated from the result. Specifically, for example, an intensity of a predetermined spectrum (frequency) is calculated as the state quantity variability. In another embodiment, the state quantity variability is calculated by simple-averaging or weighted-averaging the intensities of various spectrums.

The state quantity representative value calculating unit 14 calculates a state quantity representative value on the basis of the state quantity for each of a plurality of positions. A state quantity representative value of a certain position appropriately indicates a state of the position. In the first embodiment of the disclosure, the state quantity representative value is calculated on the basis of the state quantity of the certain position detected at a plurality of different times. For example, the state quantity representative value of a certain position is set to the newest state quantity of the state quantities of the certain position at a plurality of different times. Then, the state quantity representative value of the certain position indicates the newest state of the certain position. In another example, the state quantity representative value of a certain position is calculated by simple-averaging or weighted-averaging the state quantities of the certain position at a plurality of different times. Then, even when the state quantity of a certain position varies temporarily, the state of the position can be accurately expressed by the state quantity representative value. In the first embodiment of the disclosure, the state quantity representative value is calculated, for example, in the form of a continuous value between zero and 1. In another embodiment (not illustrated), the state quantity representative value is calculated in the form of a discrete value.

Figure 6:
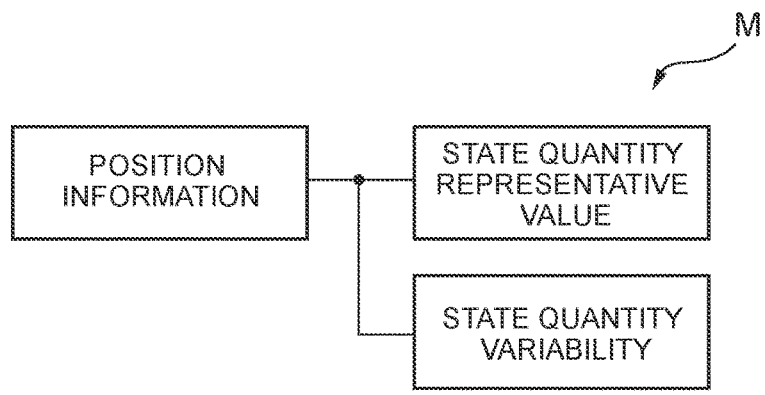
FIG. 6 is a schematic diagram illustrating environment map information according to the first embodiment of the disclosure.

The environment map preparing unit 15 prepares environment map information and stores the prepared environment map information in the environment map storage unit 3. That is, the environment map preparing unit 15 stores the state quantity representative value in correlation with the corresponding position information in the environment map storage unit 3. The environment map preparing unit 15 stores the state quantity variability in correlation with the corresponding position information in the environment map storage unit 3. In this way, the environment map information M is prepared. As a result, the environment map information M according to the first embodiment of the disclosure includes the position information indicating each of a plurality of positions in a space, the state quantity representative value correlated with the corresponding position information, and the state quantity variability correlated with the corresponding position information as illustrated in FIG. 6.

In this way, the state quantity representative value and the state quantity variability are correlated with the position information. Accordingly, when the position information is designated, the state quantity representative value and the state quantity variability of the corresponding position can be seen from the environment map information. In the first embodiment of the disclosure, the environment map information M includes the position information, the state quantity representative values, and the state quantity variabilities of positions in a three-dimensional space and thus is a three-dimensional map. In the first embodiment of the disclosure, the position information is absolute position information. In another embodiment (not illustrated), the position information is relative position information to a predetermined specific position.

When the vehicle V travels, the position information and the state quantity of each position in a space around the vehicle V are sequentially detected. Then, the state quantity representative values and the state quantity variabilities of the positions are calculated, and environment map information M is prepared from the position information, the state quantity representative value, and the state quantity variability. In this case, in the first embodiment of the disclosure, when the position information and the state quantity of each of a plurality of positions are detected at least once, environment map information M is prepared. In another embodiment (not illustrated), when the detection frequency of the position information and the state quantity of each of a plurality of positions is greater than a predetermined threshold value, environment map information M is prepared.

The following can be seen from the environment map information M prepared in this way. That is, when the state quantity of a certain position which is expressed by an object presence probability is large and the state quantity variability thereof is low, the position is occupied by a static object (such as a building or a road surface), a dynamic object which remains stationary (such as another vehicle or a pedestrian), or a quasi-static object (such as a standing signboard, a trashcan, or a branch of a tree). Alternatively, an occupied state in which the position is occupied by a dynamic object or a quasi-static object and a non-occupied state in which the position is not occupied by a dynamic object or a quasi-static object are completely switched with a relatively low frequency and a duration of the occupied state is relatively long. On the other hand, when the state quantity of a certain position is small and the state quantity variability thereof is low, there is nothing at the position. A specific example of such a position is a space above a pond. When the state quantity of a certain position is large and the state quantity variability thereof is high, the occupied state and the non-occupied state are completely switched with a relatively high frequency at the position, and a duration of the occupied state is relatively long. A specific example of such a position is a road having a relatively large traffic volume. When the state quantity of a certain position is small and the state quantity variability is high, the occupied state and the non-occupied state are completely switched with a relatively high frequency at the position, and a duration of the non-occupied state is relatively long. A specific example of such a position is a road having a relatively small traffic volume (not zero).

That is, the environment map information M according to the first embodiment of the disclosure includes information on a situation of a certain position as well as information on an object at the position or information on whether there is an object at the position. Accordingly, it is possible to more accurately express a situation in a space. Moreover, retaining various information about the environment based on the state quantity variability eliminates the need to keep the maps for various types of objects or maps for many different purposes. Therefore, the amount of the data of map information can be reduced.

In the first embodiment of the disclosure, the vehicle V determines a moving route using the environment map information M and performs automatic driving to move along the moving route. In this case, since the vehicle V can more accurately ascertain a situation in the space in which the vehicle V can move using the environment map information M, it is possible to determine an optimal moving route. Paying attention to only preparation of the environment map information M, a mobile object on which the environment map preparing system A is mounted does not need to have an automatic driving function.

Here, when a position at which map information and a state quantity are detected is referred to as a detection point, position information, a state quantity representative value, and a state quantity variability are stored for each of a plurality of detection points in the first embodiment of the disclosure. Accordingly, the environment map information M can be said to be expressed using a plurality of detection points.

Figure 7:
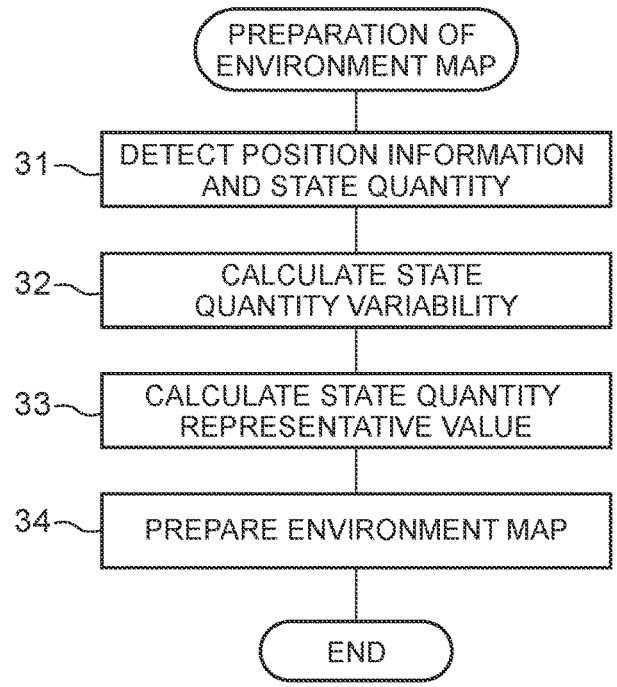
FIG. 7 is a flowchart illustrating an environment map preparation control routine according to the first embodiment of the disclosure.

FIG. 7 illustrates a routine for performing environment map preparation control according to the first embodiment of the disclosure. This routine is performed once when environment map information is to be prepared. Referring to FIG. 7, position information and a state quantity are detected in Step 31. In Step 32, a state quantity variability is calculated. In Step 33, a state quantity representative value is calculated. In Step 34, the state quantity representative value and the state quantity variability are correlated with corresponding map information to prepare environment map information M, and the environment map information M is stored in the environment map storage unit 3. In another embodiment (not illustrated), the state quantity representative value is calculated and then the state quantity variability is calculated.

In the first embodiment of the disclosure, a state quantity of a certain position is expressed by a presence probability of an object at the certain position. In another embodiment (not illustrated), a state quantity of a certain position is expressed by a color or a luminance value of an object at the certain position. In this case, for example, it is possible to ascertain which lamp of a traffic signal is lighted. In this embodiment, when the state quantity is expressed by a color of an object, the color of the object is detected by a color camera as the camera SO3 of the external sensor 1. On the other hand, when the state quantity is expressed by a luminance value of an object, the luminance value of the object is detected by the LIDAR SO1, the radar SO2, or the color or monochrome camera SO3 of the external sensor 1. That is, the intensity of a reflected beam which is acquired when a laser beam emitted from the LIDAR SO1 is reflected by an object indicates the luminance value of the object. Similarly, the intensity of a reflected wave of the radar SO2 indicates the luminance value of the object. Accordingly, the luminance value of an object is detected by detecting the intensity of a reflected beam or the intensity of a reflected wave. When a state quantity is expressed by a color of an object, the state quantity is digitalized, for example, using an RGB model.

Figure 5B:
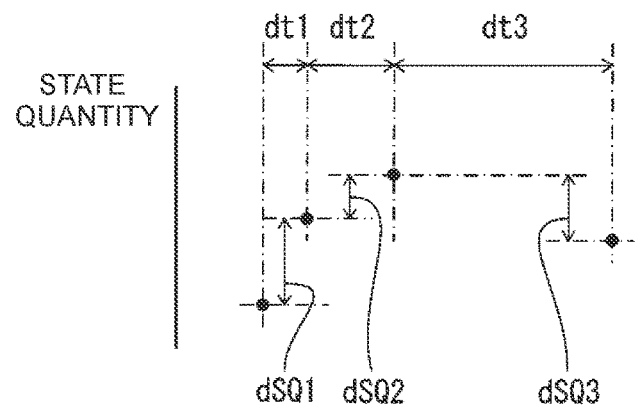
FIG. 5B is a timing chart illustrating a calculation example of a state quantity variability.

On the other hand, in the first embodiment of the disclosure, one state quantity variability is correlated with one piece of position information. In another embodiment (not illustrated), a plurality of state quantity variabilities are correlated with one piece of position information and thus the environment map information M includes a plurality of state quantity variabilities. In this case, for example, as illustrated in FIG. 5B, a plurality of state quantity variabilities are calculated on the basis of the variation of the state quantity at a plurality of different time intervals. In another example, a plurality of state quantity variabilities are calculated on the basis of the intensities of a plurality of spectrums which are acquired by Fourier-transforming the sate quantities.

Another embodiment of the method of calculating a state quantity representative value will be described below. In the first embodiment of the disclosure, the state quantity representative value and the state quantity variability are calculated from a plurality of state quantities detected at a plurality of positions. In this case, as the detection frequency of the state quantity becomes larger, the accuracy of the state quantity representative value and the state quantity variability becomes higher. However, a large detection frequency may not be secured.

Therefore, in another embodiment, one or both of an initial value of a state quantity and an initial value of a variation of the state quantity per unit time are set using existing map information. For example, for a position at which there is a building in existing map information, an initial value of a state quantity of the position is set to 1 and an initial value of the variation of the state quantity per unit time of the position is set to zero. As a result, even when the detection frequency of the state quantity is small, it is possible to increase the accuracy of the state quantity representative value and the state quantity variability.

Figure 8:
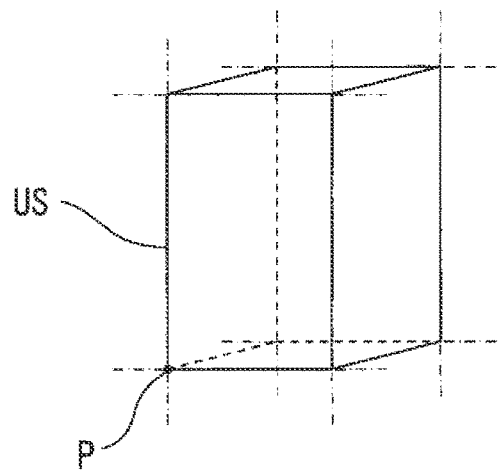
FIG. 8 is a schematic perspective view of a unit space.

Another embodiment of the environment map information M will be described below. In this embodiment, the environment map information M is expressed using voxels. That is, a plurality of voxels or unit spaces adjacent to each other are partitioned in a space. An example of a unit space is illustrated in FIG. 8, and the unit space US has a rectangular parallelepiped shape which extends in the vertical direction in the example illustrated in FIG. 8. Then, the position information, the state quantity representative value, and the state quantity variability are stored for each unit space US. In this case, the position information of the unit space US is expressed by absolute position information of one arbitrary point in the unit space US indicated by P in FIG. 8. On the other hand, the state quantity representative value and the state quantity variability of the unit space US can be calculated using various methods which will be described below.

In a first calculation example, similarly to the first embodiment of the disclosure, first, position information and a state quantity are detected and a state quantity representative value and a state quantity variability are calculated for each of a plurality of positions in a space. Subsequently, unit spaces US to which the positions at which the position information and the state quantity are detected, that is, detection points, belong are specified. Then, the state quantity representative value of the corresponding unit space US is calculated on the basis of the state quantity representative value of the detection points belonging to the specified unit space US. For example, the state quantity representative value of the unit space US is calculated by simple-averaging or weighted-averaging the state quantity representative values of the detection points belonging to the corresponding unit space US. Similarly, the state quantity variability of a unit space US is calculated on the basis of the state quantity variabilities of the detection points belonging to the corresponding unit space US. For example, the state quantity variability of the unit space US is calculated by simple-averaging or weighted-averaging the state quantity variabilities of the detection points belonging to the corresponding unit space US. In this case, the state quantity representative value of the unit space US is correlated with the position information of the unit space US, the state quantity variability of the unit space US is correlated with the position information of the unit space US, environment map information M is prepared as a result, and the environment map information M is stored in the environment map storage unit 3. The state quantity representative values and the state quantity variabilities of the detection points belonging to the unit space US are not stored in the environment map storage unit 3. Accordingly, it is possible to reduce an amount of data stored in the environment map storage unit 3.

In a second calculation example, position information and a state quantity are detected for each of a plurality of positions in a space. Then, unit spaces US to which the positions at which the position information and the state quantity are detected, that is, detection points, belong are specified. The state quantity of a detection point belonging to a specific unit space US can be considered to be a state quantity of the corresponding unit space US. Subsequently, the state quantity representative value of the corresponding unit space US is calculated using the state quantities of one or more detection points belonging to the specified unit space US. The state quantity variability of the corresponding unit space US is calculated using the state quantities of a plurality of detection points belonging to the specified unit space US.

In a third calculation example, a state quantity of a unit space US is detected for each of a plurality of unit spaces US, and the state quantity representative values and the state quantity variabilities of the unit spaces US are calculated from the detected state quantities. Various specific examples of the method of detecting a state quantity of a unit space US in the third calculation example when the external sensor 1 is a LIDAR will be described below.

In a first specific example of the third calculation example, when a unit space US is irradiated with laser beams from the LIDAR 1, a ratio (for example, NLR/LFP) of the number of laser beams NLR reflected by the unit space US and the number of laser beams NLP passing through the unit space US is calculated and the state quantity of the unit space US is set to the ratio NLR/NLP. The number of laser beams reflected NLR or the ratio NLR/NLP indicates a size of an object in the unit space US or a presence probability of an object in the unit space US.

Figure 9:
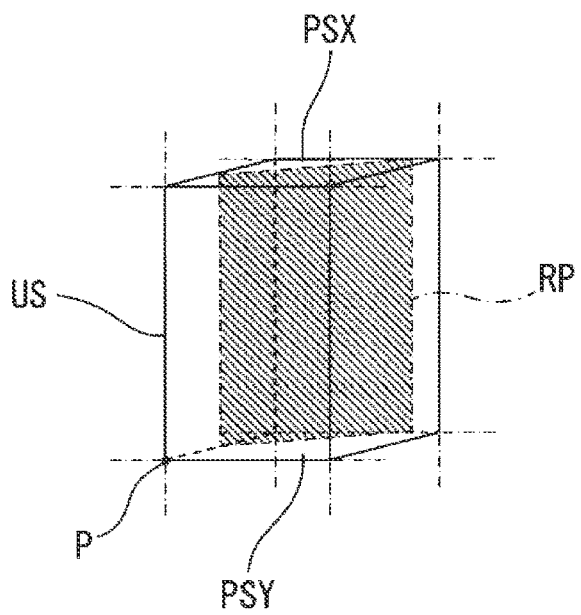
FIG. 9 is a schematic perspective view of a unit space illustrating a reflecting surface.

In a second specific example of the third calculation example, a reflecting surface which is a plane or a curved surface and which is acquired by connecting reflecting points of the laser beams formed in the unit space US is supposed. An example of the reflecting surface is illustrated in FIG. 9, and the reflecting surface RP in the example illustrated in FIG. 9 is a plane. The reflecting surface RP partitions the unit space US into a sub space PSX distant from the LIDAR 1 with respect to the reflecting surface RP and a sub space PSY close to the LIDAR 1 with respect to the reflecting surface RP. Subsequently, the volumes of the sub spaces PSX and PSY are calculated, a ratio thereof (for example, PSX/PSY) is calculated, and the state quantity of the unit space US is set to the ratio PSX/PSY. The volume of the sub space PSX or the ratio PSX/PSY indicates a size of an object in the unit space US or a presence probability of an object in the unit space US.

In a third specific example of the third calculation example, a ratio (for example, NPRR/NPR) of the total number of reflecting points NPR of a laser beam formed in a unit space US and the number of reflecting points NPRR at which the intensity of a reflected beam is greater than a predetermined threshold value is calculated and the state quantity of the unit space US is set to the ratio NPRR/NPR. The number of high-reflecting points NPRR or the ratio NPRR/NPR indicates a size of an object in the unit space US or a presence probability of an object in the unit space US.

In the second calculation example and the third calculation example, it is possible to reduce an amount of data stored in the environment map storage unit 3 and to shorten the time required for preparing environment map information M.

In the third calculation example, in brief, the state quantity is a ratio of the volume of a part or all of the unit space US occupied by an object to the volume of the unit space US. This ratio indicates a size of an object in the unit space US or a presence probability of an object in the unit space US as described above. In another embodiment, in a predetermined period of time t0, a time t1 in which a certain position is occupied by an object and a time in which the certain position is not occupied by the object are calculated and the state quantity of the certain position is set to a ratio (t1/t0) of the time t1 in which the certain position is occupied by the object in the predetermined period of time t0. This ratio indicates a size of an object in the unit space US or a presence probability of an object in the unit space US.

Another embodiment of the environment map information M will be described below. In this embodiment, the environment map information M is expressed using at least one of a mesh, basic shape called primitives, and a function expression indicating a plane. The basic shapes include a sphere, a rectangular parallelepiped, a cylinder, and a cone. Then, in the first specific example, first, a plurality of detection points at which the state quantity representative values are almost identical and the state quantity variabilities are almost identical are extracted from a plurality of detection points. Subsequently, a mesh or a basic shape matching the shape obtained by connecting the extracted detection points is selected. Then, the extracted detection points are replaced with the selected mesh or basic shape, and the mesh or basic shape is stored. In this case, the position information of the mesh or basic shape is expressed by absolute position information of an arbitrary point in the mesh or basic shape, and the state quantity representative value and the state quantity variability of the mesh or basic shape are calculated on the basis of the state quantity representative values and the state quantity variabilities of the detection points belonging to the mesh or basic shape. For example, a plurality of detection points indicating a road surface are replaced with a mesh, a plurality of detection points indicating a building is replaced with a rectangular parallelepiped, and a plurality of detection points indicating an electric pole are replaced with a cylinder. On the other hand, in the second specific example, the environment map information M is first expressed using voxels, and then some or all of the voxels are replaced with a mesh or basic shape. At any rate, it is possible to reduce an amount of data stored in the environment map storage unit 3.

When the mesh or basic shape to be replaced is selected and information on a position and a size of a road, a building, or an electric pole is acquired in advance, for example, from existing map information, the environment map information M can be easily prepared.

On the other hand, when the environment map information M is expressed using voxels, the size of a unit space US indicates a resolution of the environment map information M. It is preferable that the resolution be as high as possible, but when the resolution is excessively high, an amount of data of the environment map information M is excessively large, which is not preferable. On the other hand, when the vehicle V travels by automatic driving, a position of an object serving as an obstacle to travel of the vehicle V is specified using the environment map information M and a moving route is determined to avoid the obstacle. Paying attention to this point, the size (for example, a volume) of a unit space US indicating the resolution of the environment map information M does not need to be set to be smaller than the size of a smallest obstacle among obstacles to travel of the vehicle. Alternatively, paying attention to estimation of the position of the vehicle V in the environment map information M when the vehicle V travels by automatic driving, the size (for example, a size in the horizontal direction) of a unit space US in the environment map information M does not need to be set to be smaller than position estimation accuracy. Alternatively, paying attention to control of the position of the vehicle V to move along a moving route which is determined using the environment map information M when the vehicle V travels by automatic driving, the size (for example, a size in the horizontal direction) of a unit space US in the environment map information M does not need to be set to be smaller than position control accuracy. Accordingly, in order to shorten the preparing time of the environment map information M and to reduce the amount of data thereof, it is preferable that the size of the unit space US indicating the resolution of the environment map information M be set to be equal to or greater than the size of the smallest obstacle, equal to or greater than the position estimation accuracy of the vehicle V, or equal to or greater than the position control accuracy of the vehicle V. The size of a unit mesh when the environment map information M is expressed using a mesh and the size (for example, a volume) of a unit basic shape when the environment map information M is expressed using a basic shape are also set in this way.

In order to shorten a preparing time of environment map information M and to reduce an amount of data thereof, it is preferable that the state quantity representative value be binarized. Specifically, the state quantity representative value is changed, for example, to zero when the calculated state quantity representative value is less than a predetermined threshold value, and the state quantity representative value is changed, for example, to 1 when the calculated state quantity representative value is equal to or greater than the threshold value. On the other hand, it is preferable that the state quantity variability not be binarized. This is to finely ascertain a variation tendency of the state quantity.

A second embodiment of the disclosure will be described below. Differences from the first embodiment of the disclosure will be described below.

Figure 10:
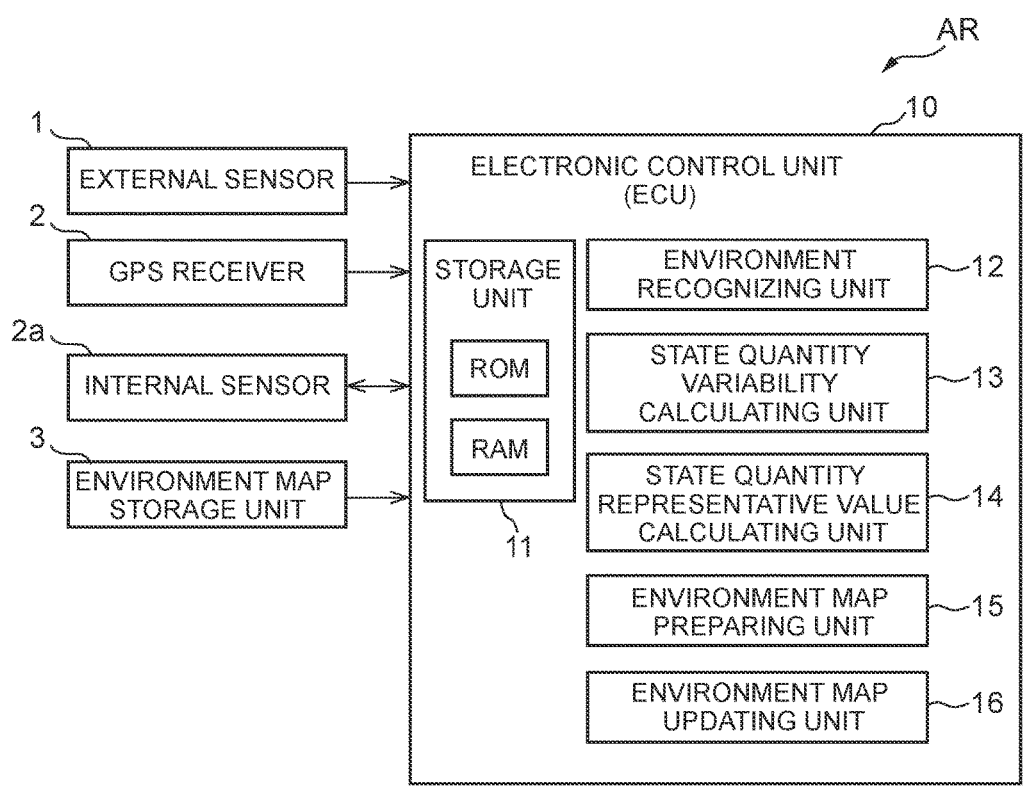
FIG. 10 is a block diagram illustrating an environment map preparing and updating system according to a second embodiment of the disclosure.

FIG. 10 is a block diagram of an environment map preparing and updating system AR according to the second embodiment of the disclosure. In the second embodiment of the disclosure, the electronic control unit 10 further includes an environment map updating unit 16.

Figure 11:
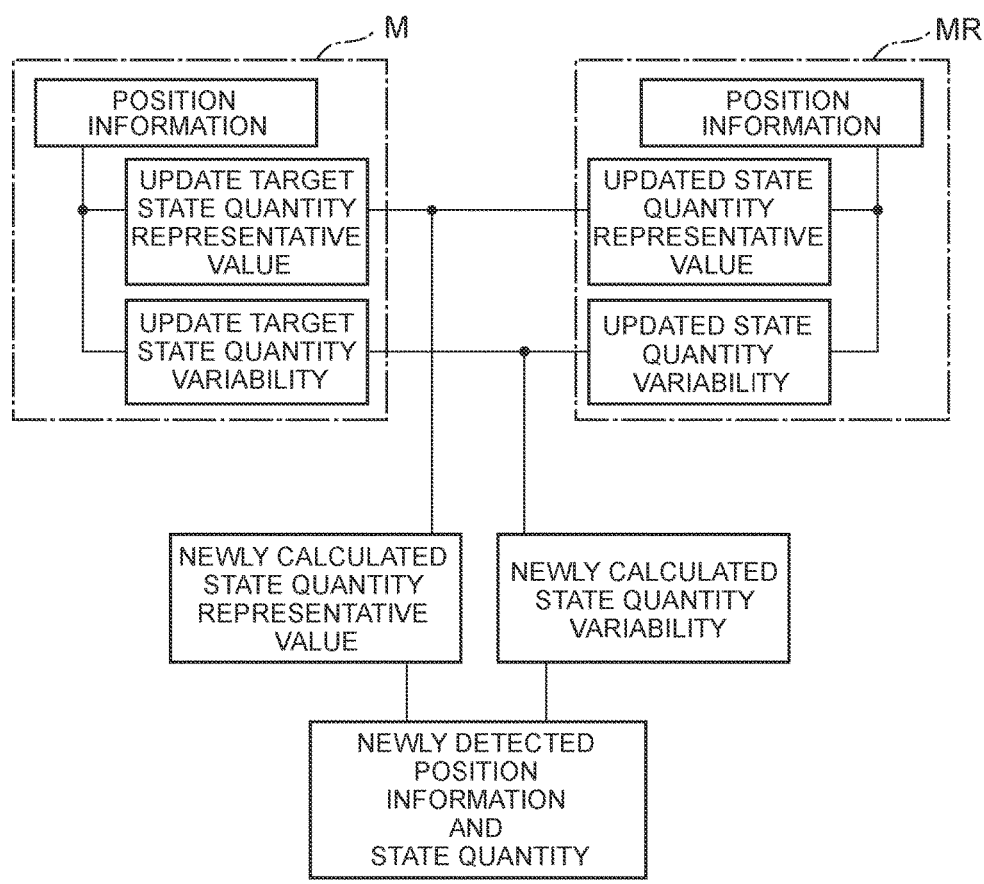
FIG. 11 is a block diagram illustrating the second embodiment of the disclosure.

The environment map updating unit 16 updates environment map information stored in the environment map storage unit 3, that is, update target environment map information. That is, as schematically illustrated in FIG. 11, the environment recognizing unit 12 newly detects position information and state quantities of a plurality of positions even after environment map information is prepared. The state quantity variability calculating unit 13 newly calculates the state quantity variability using the newly detected state quantities for each of the plurality of positions. The state quantity representative value calculating unit 14 newly calculates the state quantity representative value on the basis of the newly detected state quantities. The environment map updating unit 16 updates the state quantity representative value of the update target environment map information M using the newly detected position information and the newly calculated state quantity representative value, and stores the updated state quantity representative value in correlation with the corresponding position information in the environment map storage unit 3. The environment map updating unit 16 updates the state quantity variability of the update target environment map information M using the newly detected position information and the newly calculated state quantity variability, and stores the updated state quantity variability in correlation with the corresponding position information in the environment map storage unit 3. In this way, the update target environment map information M is updated or the updated environment map information MR is prepared.

Specifically, in the second embodiment of the disclosure, an updated state quantity representative value SQR is calculated by weighted-averaging the state quantity representative value SQO of the update target environment map information and the newly calculated state quantity representative value SQN for each of a plurality of positions. An updated state quantity variability VAR is calculated by weighted-averaging the state quantity variability VA0 of the update target environment map information and the newly calculated state quantity variability VAN for each of a plurality of positions. That is, the updated state quantity representative value SQR and the updated state quantity variability VAR are expressed, for example, by the following expression using a weighting factor K ($0 \leq K \leq 1$).

$$SQR = SQ0 \cdot K + SQN \cdot (1-K)$$

$$VAR = VA0 \cdot K + VAN \cdot (1-K)$$

By updating the environment map information in this way, a situation of a space can be more accurately ascertained.

Figure 12:
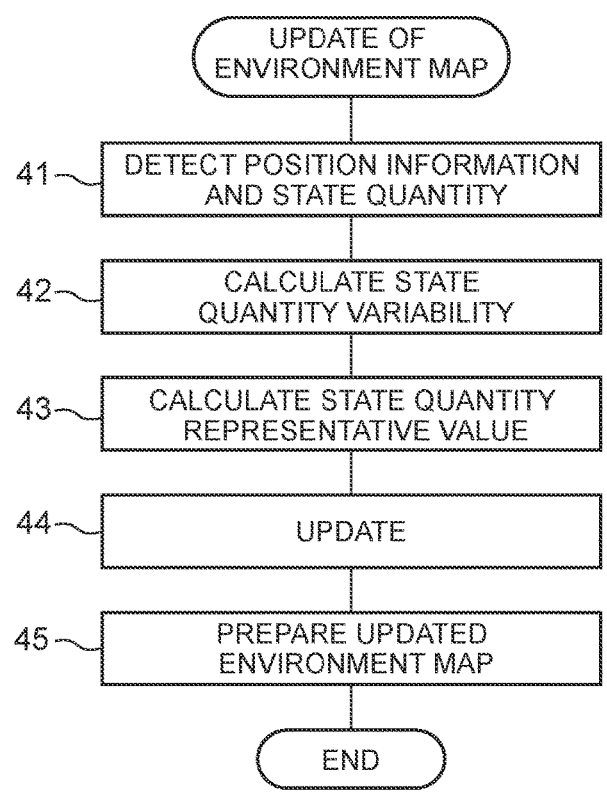
FIG. 12 is a flowchart illustrating an environment map update control routine according to the second embodiment of the disclosure.

FIG. 12 illustrates a routine for performing environment map updating control according to the second embodiment of the disclosure. This routine is performed once when environment map information is to be updated. Referring to FIG. 12, position information and a state quantity are newly detected in Step S41. In Step S42, a state quantity variability is newly calculated. In Step S43, a state quantity representative value is newly calculated. In Step S44, the state quantity representative value and the state quantity variability are updated. In Step S45, the updated state quantity representative value and the updated state quantity variability are correlated with the corresponding map information to prepare updated environment map information and the updated environment map information is stored in the environment map storage unit 3.

In the second embodiment of the disclosure, the update target environment map information is prepared by the environment map preparing unit 15 mounted on the vehicle V. In another embodiment (not illustrated), the update target environment map information is environment map information which is prepared on the outside of the vehicle V and stored in advance in the environment map storage unit 3.

Figure 13:
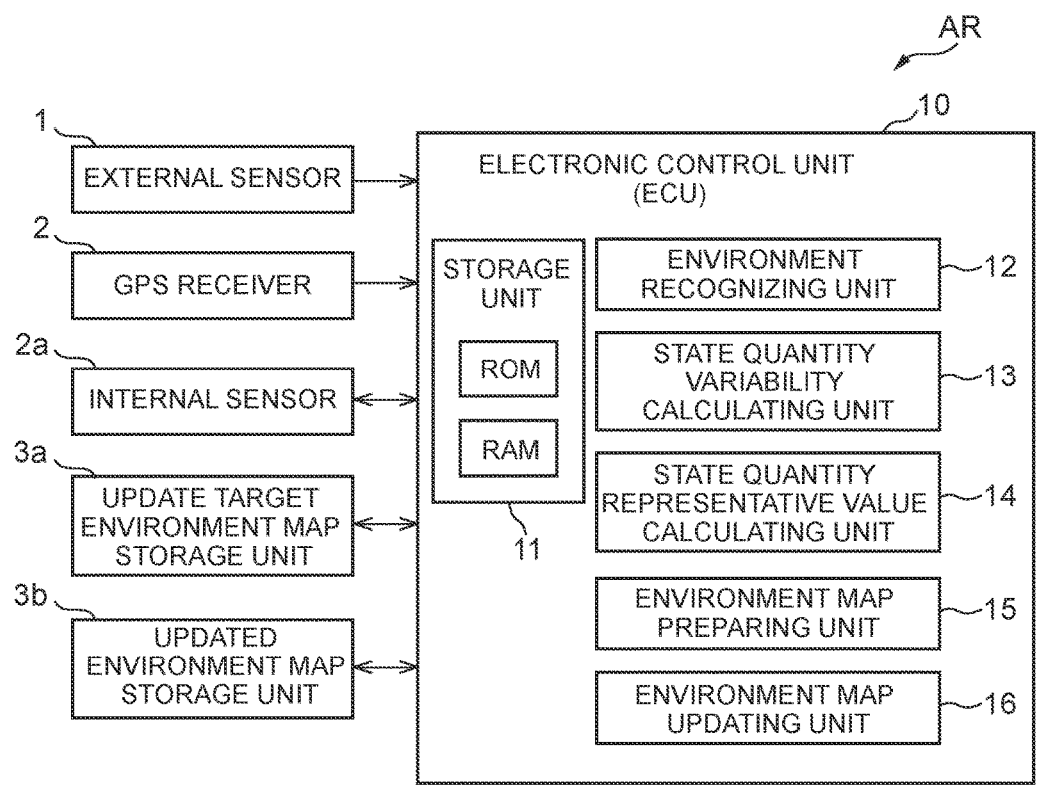
FIG. 13 is a block diagram illustrating an environment map preparing and updating system according to another embodiment.

In the second embodiment of the disclosure, the update target environment map information and the updated environment map information are stored in the same environment map storage unit 3. On the other hand, in an embodiment illustrated in FIG. 13, the environment map storage unit 3 includes an update target environment map storage unit 3a and an updated environment map storage unit 3b which are different from each other. Update target environment map information is stored in the update target environment map storage unit 3a. Updated environment map information is stored in the updated environment map storage unit 3b.

A third embodiment of the disclosure will be described below. Differences from the second embodiment of the disclosure will be described below.

Figure 14:
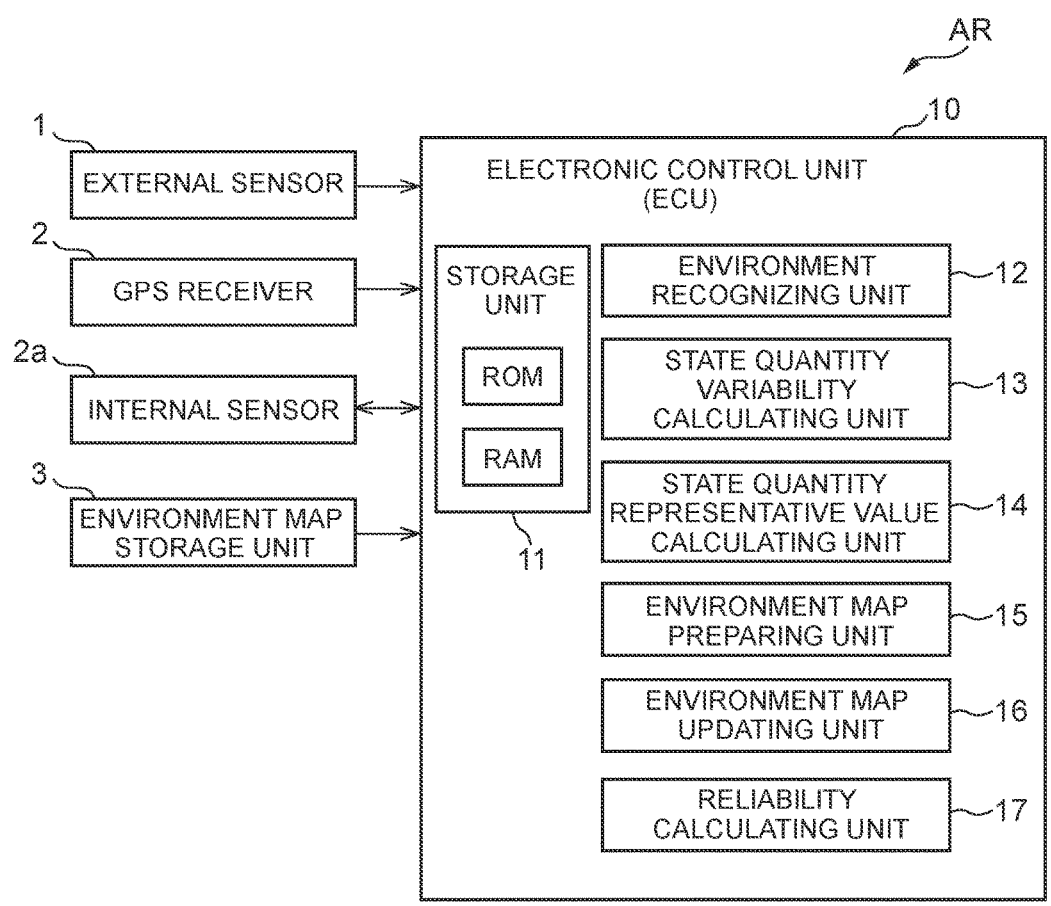
FIG. 14 is a block diagram illustrating an environment map preparing and updating system according to a third embodiment of the disclosure.

FIG. 14 illustrates a block diagram of an environment map preparing and updating system AR according to the third embodiment of the disclosure. In the third embodiment of the disclosure, the electronic control unit 10 further includes a reliability calculating unit 17.

The reliability calculating unit 17 calculates a reliability which is detection accuracy of the newly detected position information and state quantity. Then, the environment map updating unit 16 updates the state quantity representative value and the state quantity variability using the reliability.

When the reliability is low, the accuracy of the state quantity representative value and the state quantity variability which are newly calculated on the basis of the newly detected position information and state quantity is lower than that when the reliability is high. When the environment map information is updated using the state quantity representative value and the state quantity variability having low accuracy, the accuracy of the environment map information decreases.

Therefore, in the third embodiment of the disclosure, the weighting factor K is set on the basis of the reliability. Specifically, when the reliability is low, the weighting factor K is set to be larger than that when the reliability is high. When the weighting factor K is set to be larger, the weighting of the newly calculated state quantity representative value and the newly calculated state quantity variability decreases as can be seen from the above-mentioned calculation expression for updating.

Figure 15:
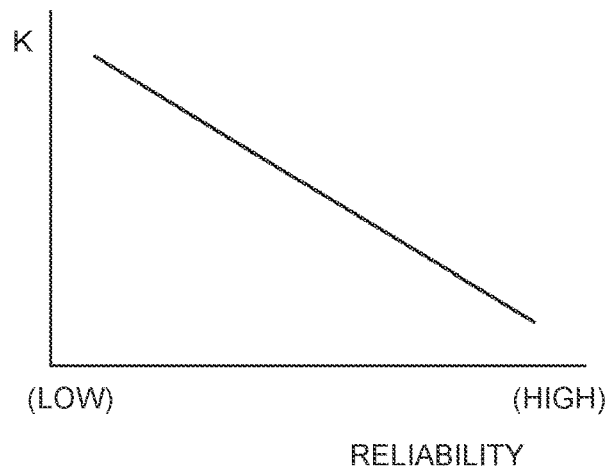
FIG. 15 is a diagram illustrating an example of a weighting factor map according to the third embodiment of the disclosure.
Figure 16:
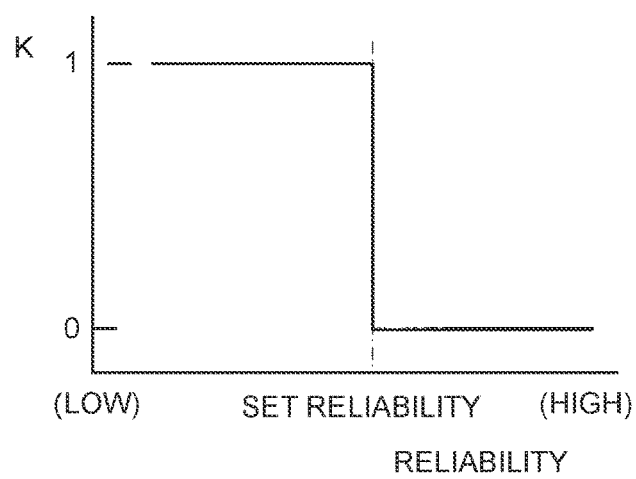
FIG. 16 is a diagram illustrating another example of the weighting factor map according to the third embodiment of the disclosure.

FIGS. 15 and 16 illustrate various examples of the weighting factor K in the third embodiment of the disclosure. In the example illustrated in FIG. 15, the lower the reliability becomes, the larger the weighting factor K becomes. In the example illustrated in FIG. 16, the weighting factor K is set to a relatively small value, for example, zero, when the reliability is higher than predetermined set reliability, and the weighting factor K is set to a relatively large value, for example, 1, when the reliability is lower than the set reliability. As a result, it is possible to prevent the accuracy of the environment map information from being lowered due to the updating.

The reliability is calculated, for example, as follows. When detection accuracy of the external sensor 1 is low, the reliability is calculated to be lower than that when the detection accuracy of the external sensor 1 is high. Alternatively, when the detection frequency of the position information and the state quantity per unit time is small, the reliability is calculated to be lower than that when the detection frequency is large. Alternatively, when the vehicle V estimates the position of the vehicle V and the position estimation accuracy of the vehicle is low, the reliability is calculated to be lower than that when the position estimation accuracy of the vehicle is high.

A fourth embodiment of the disclosure will be described below. Differences from the second embodiment of the disclosure will be described below.

Figure 17:
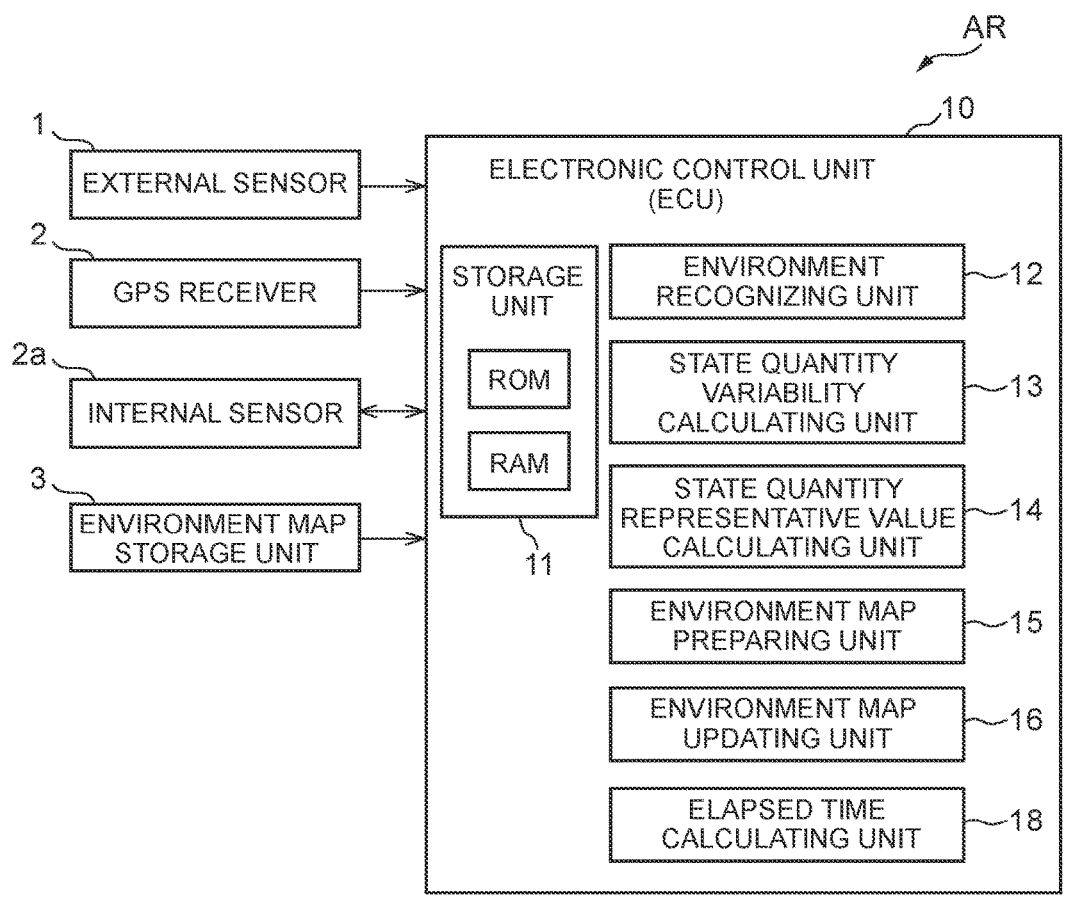
FIG. 17 is a block diagram illustrating an environment map preparing and updating system according to a fourth embodiment of the disclosure.

FIG. 17 illustrates a block diagram of an environment map preparing and updating system AR according to the fourth embodiment of the disclosure. In the fourth embodiment of the disclosure, the electronic control unit 10 further includes an elapsed time calculating unit 18.

Figure 18:
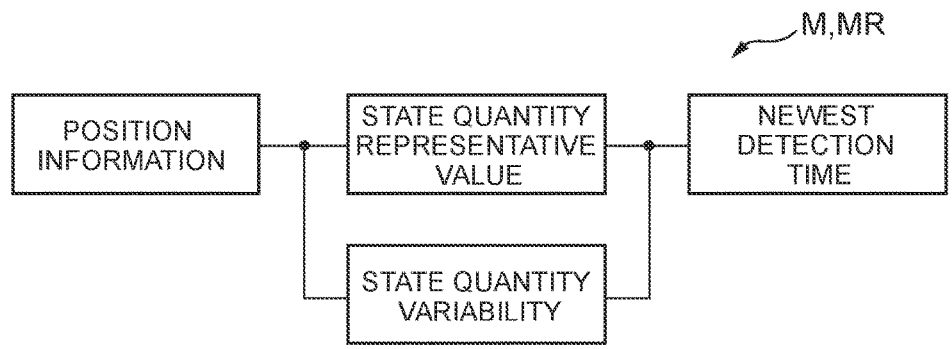
FIG. 18 is a schematic diagram illustrating environment map information according to the fourth embodiment of the disclosure.

Environment map information M, MR in the fourth embodiment of the disclosure additionally includes a newest detection time which is correlated with the corresponding state quantity representative value and the corresponding state quantity variability as illustrated in FIG. 18. The newest detection time is the newest among detection times of the state quantity which is used to calculate the corresponding state quantity representative value and the corresponding state quantity variability.

The elapsed time calculating unit 18 calculates a difference between the newest detection time and a current time, that is, an elapsed time, for each of a plurality of positions. Then, the environment map updating unit 16 updates the state quantity representative value and the state quantity variability on the basis of the elapsed time.

When the elapsed time is short, a possibility of a situation in a space varying is lower than that when the elapsed time is long. Accordingly, there is a low necessity to update the environment map information. On the other hand, when the elapsed time is long, a possibility of the situation in the space varying is higher than that when the elapsed time is short. Accordingly, there is a high necessity to update the environment map information.

Therefore, in the fourth embodiment of the disclosure, the weighting factor K is set on the basis of the elapsed time. Specifically, when the elapsed time is short, the weighting factor K is set to be larger than that when the elapsed time is long. When the weighting factor K is set to be larger, the weighting of the newly calculated state quantity representative value and the newly calculated state quantity variability decreases as can be seen from the above-mentioned calculation expression for updating.

Figure 19:
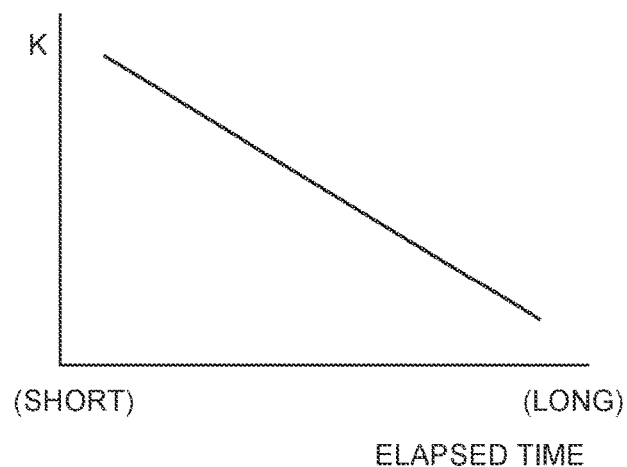
FIG. 19 is a diagram illustrating an example of a weighting factor map according to the fourth embodiment of the disclosure.
Figure 20:
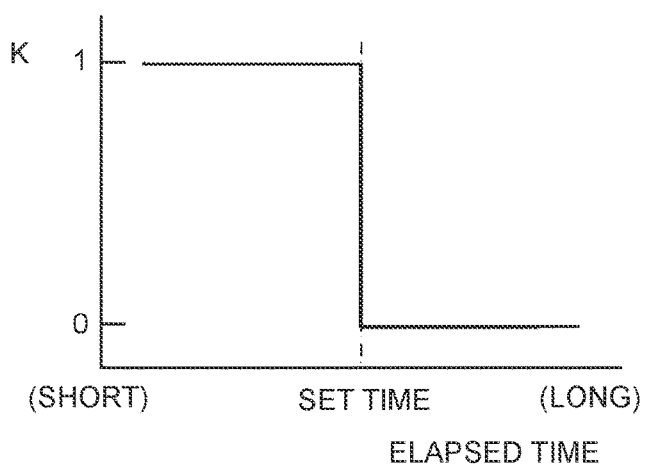
FIG. 20 is a diagram illustrating another example of the weighting factor map according to the fourth embodiment of the disclosure.

FIGS. 19 and 20 illustrate various examples of the weighting factor K in the fourth embodiment of the disclosure. In the example illustrated in FIG. 19, the shorter the elapsed time becomes, the larger the weighting factor K becomes. In the example illustrated in FIG. 20, the weighting factor K is set to a relatively small value, for example, zero, when the elapsed time is longer than a predetermined set time, and the weighting factor K is set to a relatively large value, for example, 1, when the elapsed time is shorter than the set time. As a result, it is possible to appropriately set the weighting of the newly calculated state quantity representative value and the newly calculated state quantity variability depending on the elapsed time.

A fifth embodiment of the disclosure will be described below. Differences from the second embodiment of the disclosure will be described below.

In the second embodiment of the disclosure, when a state quantity of a certain position is newly detected, the state quantity representative value and the state quantity variability of the certain position are updated. When updating is performed at all the positions at which the state quantity is newly detected in this way, there is a possibility of a load of the electronic control unit 10v of the vehicle V increasing and there is a possibility of a long time being required to update the environment map information.

Therefore, in the fifth embodiment of the disclosure, the environment map updating unit 16 determines an update target position which is an update target position among positions of the environment map information M stored in the environment map storage unit 3 and updates the state quantity representative value and the state quantity variability of the update target position. On the other hand, positions other than the update target position are not updated. As a result, it is possible to simply update the environment map information for a short time. Various determination examples of an update target position will be described below.

In a first determination example of an update target position, the update target position is determined on the basis of the state quantity variability of update target environment map information. For example, a position at which the state quantity variability of the update target environment map information is higher than a predetermined lower limit value is determined to be the update target position. In other words, positions at which the state quantity variability is low are not updated. This is because a position at which the state quantity variability is considerably low has a considerably low possibility of the situation of the position varying. When a situation of a certain position varies, the environment map information of the position has to be updated.

In a second determination example of an update target position, the update target position is determined on the basis of the state quantity representative value of update target environment map information and a newly calculated state quantity representative value. For example, a position at which a difference (absolute value) between the state quantity representative value of the update target environment map information and the newly calculated state quantity representative value is larger than a predetermined first set value is determined to be the update target position. This is because a position at which the state quantity representative value varies greatly has a high possibility of the situation of the position varying.

In a third determination example of an update target position, the update target position is determined on the basis of the state quantity variability of update target environment map information and a newly calculated state quantity variability. For example, a position at which a difference (absolute value) between the state quantity variability of the update target environment map information and the newly calculated state quantity variability is larger than a predetermined second set value is determined to be the update target position. This is because a position at which the state quantity variability varies greatly has a high possibility of the situation of the position varying.

In a fourth determination example of an update target position, the update target position is determined on the basis of the state quantity representative value SQO and the state quantity variability VA0 of update target environment map information and a newly calculated state quantity representative value SQN. For example, a position at which an index value IDX indicated by the following expression is larger than a predetermined third set value is determined to be the update target position.

$$IDX = |SQO - SQM|/VA0$$

In the second determination example of an update target position, when the state quantity representative value of a certain position varies greatly, a possibility of the situation of the certain position varying is determined to be high. However, at a position at which the state quantity variability is high, the state quantity representative value is likely to vary. Accordingly, at a position at which the state quantity variability is high, a possibility of the situation of the certain position varying may be considered to be low even when the state quantity representative value varies greatly. On the other hand, at a position at which the state quantity representative value is not likely to vary, a possibility of the situation of the certain position varying may be considered to be high when the state quantity representative value varies greatly. On the other hand, the index value IDX has a small value when the state quantity variability VA0 is large, and has a large value when the state quantity variability VA0 is small and the state quantity representative value varies greatly. Therefore, in the fourth determination example of an update target position, a position at which the index value IDX is large is determined to be the update target position.

In a fifth determination example of an update target position, the update target position is determined on the basis of the state quantity representative value and the state quantity variability of update target environment map information, a newly calculated state quantity representative value, and a newly calculated state quantity variability. For example, a position at which both the state quantity variability of the update target environment map information and the newly calculated state quantity variability are lower than a predetermined fourth set value and a difference (absolute value) between the state quantity representative value of the environment map information and the newly calculated state quantity representative value is larger than a predetermined fifth set value is determined to be the update target position. In other words, a position or an area in which the state quantity variability remains low and the state quantity representative value varies greatly is determined to be the update target position.

When a quasi-static object moves or when a static object is created or dissolved (for example, construction or demolition of a building), the state quantity variability of the corresponding position or area remains low and the state quantity representative value varies greatly. Accordingly, in the above-mentioned example, the position or area in which a quasi-static object moves or the position or area in which a static object is created or dissolved is determined to be the update target position.

More specifically, in this example, when a quasi-static object moves, a previous position or a new position of the quasi-static object is determined to be an update target position. Specifically, at the previous position of the quasi-static object, a position or area in which the state quantity variability remains low and the state quantity variability decreases greatly is determined to be the update target position. At the new position of the quasi-static object, a position or area in which the state quantity variability remains low and the state quantity representative value increases greatly is determined to be the update target position. In this case, by performing pattern matching on the area in which the state quantity representative value decreases greatly and the area in which the state quantity representative value increases greatly, the shape of the quasi-static object is maintained and the environment map information is updated. Accordingly, it is possible to more accurately update the environment map information.

On the other hand, when a static object is created or dissolved, a position or area in which the state quantity variability remains low and the state quantity representative value varies greatly and a periphery thereof are determined to be positions to be updated. This is because when a building or the like is constructed or demolished, there is a high possibility of a situation of the periphery thereof varying.

When the state quantity variability of a certain position remains low and the state quantity representative value thereof varies greatly, whether the variation is based on movement of a quasi-static object or creation of a static object can be determined, for example, as follows. That is, when the area or volume of a position or area in which the variation occurs is small, when a partner of the pattern matching is present, or when the variation occurs in a short order of time (for example, an order of days, weeks, or months), the variation is determined to be based on the movement of a quasi-static object. On the other hand, when the area or volume of a position or area in which the variation occurs is large, when a partner of the pattern matching is not present, or when the variation occurs in a long order of time (for example, an order of years), the variation is determined to be based on the creation of a static object.

In a sixth determination example of an update target position, the environment map information of a position is repeatedly updated at a predetermined updating interval for each position. In other words, a position at which an updating time which is determined depending on the corresponding updating interval arrives is determined to be the update target position. In this case, at a position at which the updating interval is set to be short, the accuracy of the environment map information becomes higher. On the other hand, at a position at which the updating interval is set to be long, a calculation load of the electronic control unit 10 decreases.

The updating interval is set, for example, as follows. In a first setting example of the updating interval, an updating interval of a certain position is set depending on the state quantity variability of the position of the update target environment map information. For example, at a position at which the state quantity variability of the update target environment map information is low, the updating interval is set to be longer than that at a position at which the state quantity variability of the update target environment map information is high. This is because there is a high possibility that the situation of the position at which the state quantity variability is low varies.

In a second setting example of the updating interval, an updating interval of a certain position is set depending on the state quantity representative value of the position of the update target environment map information. For example, at a position at which the state quantity representative value of the update target environment map information is small, the updating interval is set to be shorter than that at a position at which the state quantity representative value of the update target environment map information is large. This is because it is necessary to more accurately ascertain in a variation from a state in which no obstacle is present to a state in which an obstacle is present than that in a variation from a state in which an obstacle is present to a state in which no obstacle is present.

In a seventh determination example of an update target position, the update target position is determined depending on external information. Examples of the external information include information indicating a place in which road construction is carried out and information indicating a place in which a building is constructed or demolished.

In an eighth determination example of an update target position, an update target area is first selected and then a position belonging to the selected update target area is determined to be an update target position. Examples of the update target area include areas which are partitioned in units of prefectures, in units of municipalities, in units of roads, or in units of intersections or areas which are partitioned to have a constant area. When another update target area is selected, the update target position is changed.

When the environment map information M is expressed using the above-mentioned basic shape or the like, the environment map information can also be updated. Updating of a basic shape or the like in this case will be described below. For example, when a basic shape representing an object is included in update target environment map information M and the object moves, the basic shape at the previous position of the quasi-static object is deleted and a new basic shape is formed at a new position of the object. When the object is deformed, the basic shape representing the object is changed (for example, from a rectangular parallelepiped to a cylinder). Alternatively, the basic shape is deleted and is returned to, for example, voxels.

Figure 21:
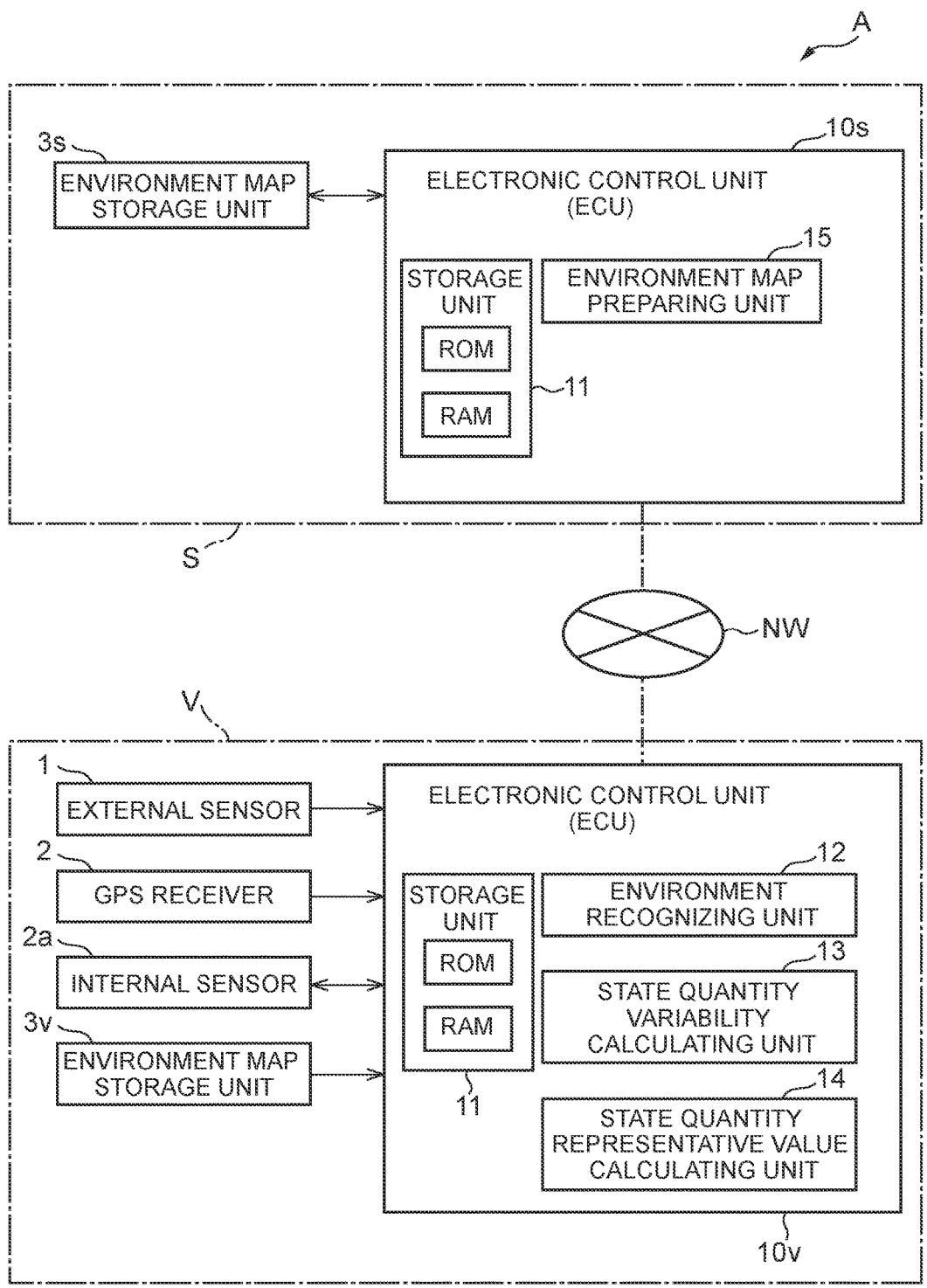
FIG. 21 is a block diagram illustrating an environment map preparing system according to another embodiment.

In the first embodiment of the disclosure, the entire environment map preparing system A is mounted on a vehicle. On the other hand, in an embodiment illustrated in FIG. 21, a part of the environment map preparing system A is mounted on the vehicle V and the other is mounted on a server S. In this case, the environment map storage unit 3 includes an environment map storage unit 3*v* and an environment map storage unit 3*s*. The electronic control unit 10 includes an electronic control unit 10*v* and an electronic control unit 10*s*. The external sensor 1, the GPS receiver 2, the environment map storage unit 3*v*, and the electronic control unit 10*v* are mounted on the vehicle v. The environment map storage unit 3*s* and the electronic control unit 10*s* are mounted on the server S. In the example illustrated in FIG. 21, the electronic control unit 10*v* includes an environment recognizing unit 12, a state quantity variability calculating unit 13, and a state quantity representative value calculating unit 14, and the electronic control unit 10*s* includes an environment map preparing unit 15. The electronic control unit 10*v* and the electronic control unit 10*s* are configured to communicate with each other via a network W.

In this case, in the vehicle V, the position information and the state quantity are detected and the state quantity representative value and the state quantity variability are calculated. The state quantity representative value and the state quantity variability are transmitted to the server S, and environment map information is prepared in the server S. The prepared environment map information is stored in the environment map storage unit 3*s*. The environment map information stored in the environment map storage unit 3*s* is read by the vehicle V and is stored in the environment map storage unit 3*v*. In the vehicle V, automatic driving is performed using the environment map information in the environment map storage unit 3*v*.

In this way, the environment map information can be prepared using the state quantity representative value and the state quantity variability which are calculated in a plurality of vehicles V. Accordingly, it is possible to further enhance the accuracy of the environment map information. It may also be possible to reduce a load of the electronic control unit 10*v* of the vehicle V. The amount of data of the state quantity representative value and the state quantity variability is much smaller than the amount of data of the state quantity as measurement data. Accordingly, in the embodiment illustrated in FIG. 21, it is possible to reduce a communication load in comparison with a case in which the measurement data as a whole is transmitted to the server S. In another embodiment (not illustrated), the electronic control unit 10*s* of the server S also includes one or both of the state quantity variability calculating unit 13 and the state quantity representative value calculating unit 14.

Figure 22:
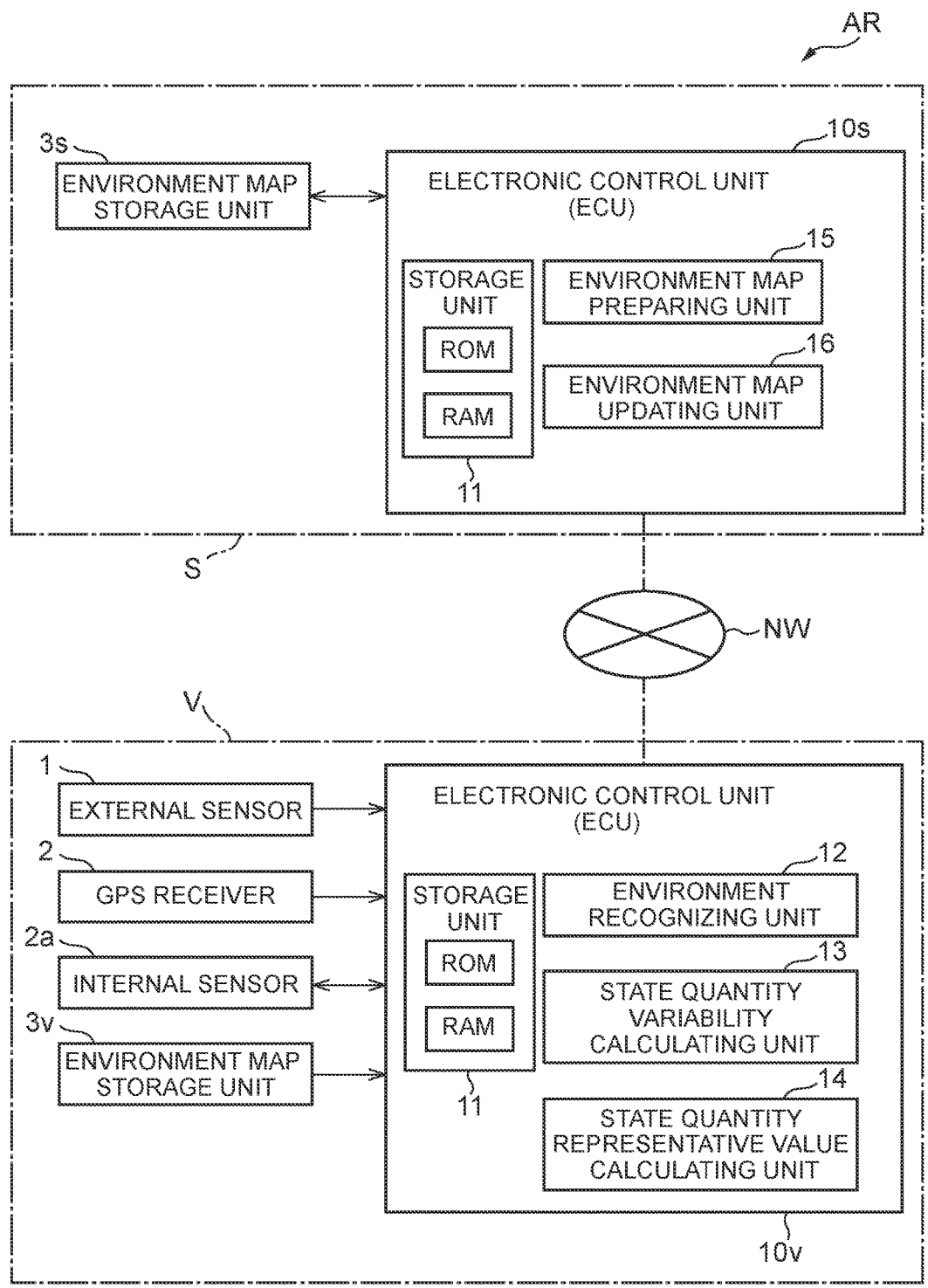
FIG. 22 is a block diagram illustrating an environment map preparing and updating system according to another embodiment.

On the other hand, in the second embodiment of the disclosure, the entire environment map preparing and updating system AR is mounted on a vehicle. On the other hand, in an embodiment illustrated in FIG. 22, a part of the environment map preparing and updating system AR is mounted on the vehicle V and the rest is mounted on a server S. In this case, the environment map storage unit 3 includes an environment map storage unit 3*v* and an environment map storage unit 3*s*. The electronic control unit 10 includes an electronic control unit 10*v* and an electronic control unit 10*s*. The external sensor 1, the GPS receiver 2, the environment map storage unit 3*v*, and the electronic control unit 10*v* are mounted on the vehicle v. The environment map storage unit 3*s* and the electronic control unit 10*s* are mounted on the server S. In the example illustrated in FIG. 22, the electronic control unit 10*v* includes an environment recognizing unit 12, a state quantity variability calculating unit 13, and a state quantity representative value calculating unit 14, and the electronic control unit 10*s* includes an environment map preparing unit 15 and an environment map updating unit 16. The electronic control unit 10*v* and the electronic control unit 10*s* are configured to communicate with each other via a network W. Update target environment map information is stored in the environment map storage unit 3*s*.

In this case, in the vehicle V, the position information and the state quantity are newly detected and the state quantity representative value and the state quantity variability are newly calculated. The state quantity representative value and the state quantity variability which have been newly calculated are transmitted to the server S, and the environment map information is updated in the server S. The updated environment map information is stored in the environment map storage unit 3s. The updated environment map information stored in the environment map storage unit 3s is read by the vehicle V and is stored in the environment map storage unit 3v. In the vehicle V, automatic driving is performed using the environment map information in the environment map storage unit 3v. In another embodiment (not illustrated), the environment map storage unit 3s of the server S includes an update target environment map storage unit and an updated environment map storage unit which are different from each other. The update target environment map storage unit stores the update target environment map information. The updated environment map storage unit stores the updated environment map information.

In this case, it is also possible to further enhance the accuracy of the environment map information and to reduce a load of the electronic control unit 10v of the vehicle V. The same is true of the third embodiment and the fourth embodiment of the disclosure and thus description thereof will not be repeated.

Figure 23:
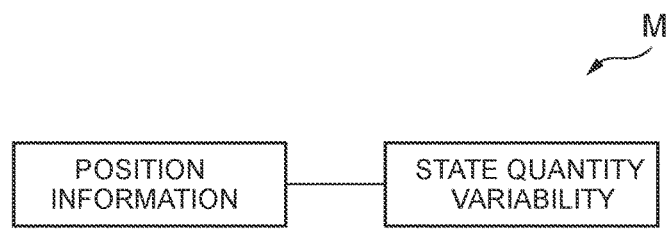
FIG. 23 is a schematic diagram illustrating another example of environment map information.

FIG. 23 illustrates another embodiment of the environment map information M. In the embodiment illustrated in FIG. 23, the environment map information M includes position information indicating a plurality of positions in a space and state quantity variabilities correlated with the corresponding position information and does not include the state quantity representative value. In this case, it is also possible to ascertain situations of a plurality of positions using the state quantity variabilities. It is possible to shorten the preparation time of the environment map information M and to reduce the amount of data of the environment map information M.

Figure 24:
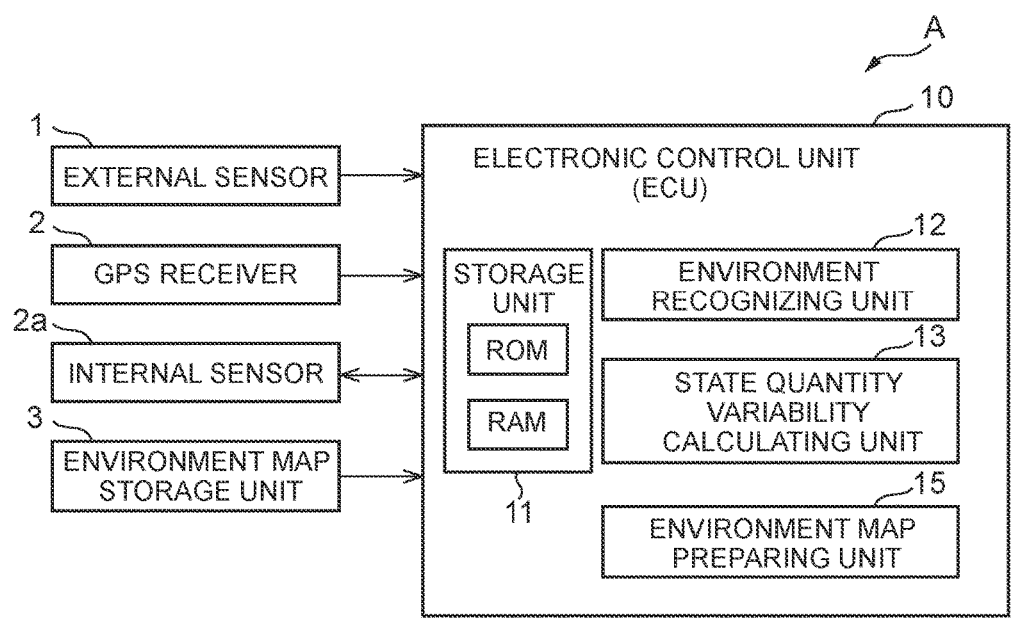
FIG. 24 is a block diagram illustrating an environment map preparing system according to the embodiment illustrated in FIG. 23.

An example of the environment map preparing system A when the environment map information M is prepared as illustrated in FIG. 23 is illustrated in FIG. 24. Compared with the environment map preparing system A illustrated in FIG. 1, the environment map preparing system A illustrated in FIG. 24 does not include the state quantity representative value calculating unit 14. In this case, the position information and the state quantity are detected for each of a plurality of positions, the state quantity variability is calculated from the detected state quantities, and the calculated state quantity variability is stored in correlation with the corresponding position information in the environment map storage unit 3.

Figure 25:
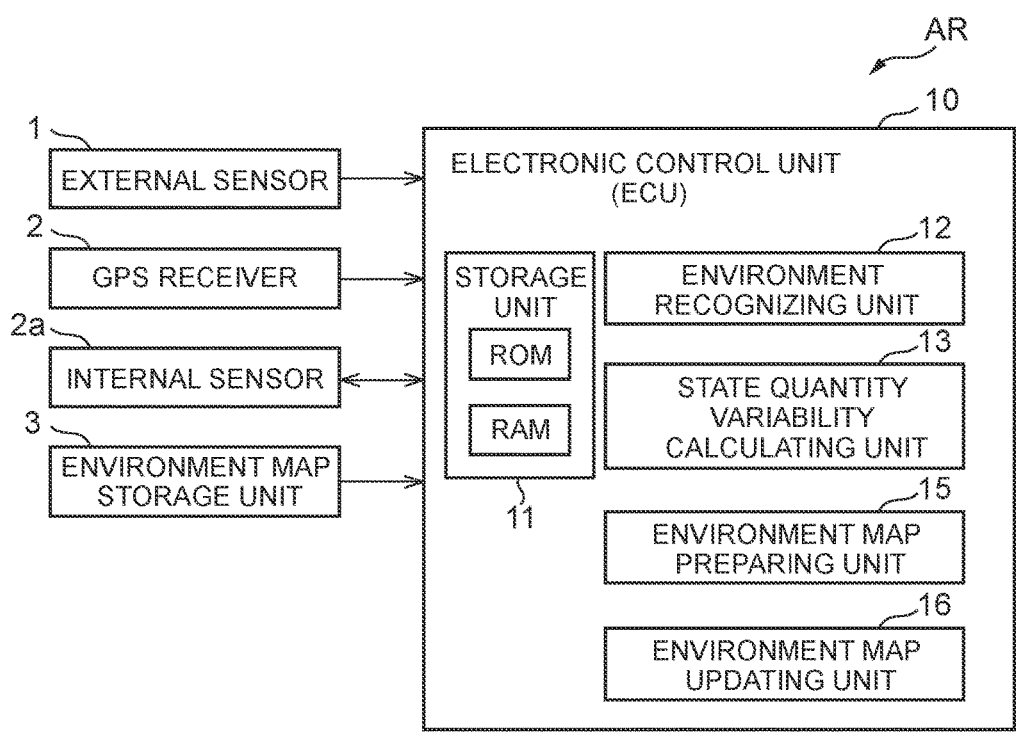
FIG. 25 is a block diagram illustrating an environment map preparing and updating system according to the embodiment illustrated in FIG. 23.

An example of the environment map preparing and updating system AR when the environment map information M is prepared as illustrated in FIG. 23 is illustrated in FIG. 25. Compared with the environment map preparing and updating system AR illustrated in FIG. 10, the environment map preparing and updating system AR illustrated in FIG. 25 does not include the state quantity representative value calculating unit 14. In this case, the position information and the state quantity are newly detected for each of a plurality of positions, the state quantity variability is newly calculated from the newly detected state quantities, the update target state quantity variability is updated using the newly calculated state quantity variability, and the updated state quantity variability is stored in correlation with the corresponding position information in the environment map storage unit 3. The third embodiment and the fourth embodiment of the disclosure can be applied to the example illustrated in FIG. 23.

According to the embodiments of the disclosure, various maps can be updated automatically because the state quantity variability can be calculated automatically.

What is claimed is:

1. A non-transitory computer-readable medium comprising:
   a data structure of an environment map including position information indicating a position in a space;
   a state quantity variability of the position, the state quantity variability being correlated with the position information, the state quantity variability indicating a variation tendency of a state quantity of the position with respect to time,
   wherein the state quantity of the position is expressed by a presence probability of an object at the position; and
   one or more instructions, that when executed by one or more processors, cause the one or more processors to:
      determine a moving route using the environment map; and
      cause a vehicle to move along the moving route based on determining the moving route.

2. The non-transitory computer-readable medium according to claim 1, further comprising a state quantity representative value of the position, the state quantity representative value being calculated based on the state quantity and being correlated with the position information.

3. The non-transitory computer-readable medium according to claim 1, further comprising a newest detection time, wherein
   the state quantity variability is calculated based on the state quantity, and the newest detection time is newest among detection times of the state quantity, the detection times of the state quantity is used to calculate the state quantity variability, the newest detection time being correlated with the state quantity variability.

4. An environment map preparing system comprising:
   a detector configured to detect position information indicating a position in a space and a state quantity of the position,
   wherein the state quantity of the position is expressed by a presence probability of an object at the position;
   an environment map storage unit; and
   an electronic control unit configured to:
      cause the detector to detect the position information and the state quantity of the position at different times for the position in the space;
      calculate a state quantity variability indicating a variation tendency of the state quantity with respect to time using the state quantity for the position;
      store the state quantity variability in correlation with the position information of a corresponding position in the environment map storage unit;
      determine a moving route using the environment map; and
      cause a vehicle to move along the moving route based on determining the moving route.

5. The environment map preparing system according to claim 4, wherein the electronic control unit is configured to:
   calculate a state quantity representative value based on the state quantity for the position; and
   store the state quantity representative value in correlation with the position information of the corresponding position in the environment map storage unit.

6. The environment map preparing system according to claim 4, wherein the electronic control unit is configured to:
   calculate a variation of the state quantity per unit time for the position; and calculate the state quantity variability based on the variation of the state quantity per unit time.

7. An environment map preparing method comprising:
  detecting position information indicating a position in a space and a state quantity of the position at different times for the position in the space,
    wherein the state quantity of the position is expressed by a presence probability of an object at the position;
  calculating a state quantity variability indicating a variation tendency of the state quantity with respect to time using the state quantity for the position;
  storing the state quantity variability in correlation with the position information of a corresponding position in an environment map storage unit;
  determining a moving route using the environment map; and
  causing a vehicle to move along the moving route based on determining the moving route.

8. The environment map preparing method according to claim 7, further comprising:
  calculating a state quantity representative value based on the state quantity for the position; and
  storing the state quantity representative value in correlation with the position information of the corresponding position in the environment map storage unit.

9. The environment map preparing system according to claim 7, further comprising calculating a variation of the state quantity per unit time for the position,
  wherein the calculating of the state quantity variability includes calculating the state quantity variability based on the variation of the state quantity per unit time.

10. An environment map updating system comprising:
  an update target environment map storage unit configured to store update target environment map information, the update target environment map information including first position information indicating a position in a space and a first state quantity variability of the position, the first state quantity variability being correlated with the first position information, the first state quantity variability indicating a first variation tendency of a state quantity of the position with respect to time,
    wherein the state quantity of the position is expressed by a presence probability of an object at the position;
  a detector configured to detect the first position information and the first state quantity of the position;
  an updated environment map storage unit; and
  an electronic control unit configured to
    newly detect a second position information indicating the position and a second state quantity of the position at different time,
    newly calculate a second state quantity variability by using the second state quantity for the position,
    update the first state quantity variability of the update target environment map information by using the second position information and the second state quantity variability,
    store the updated first state quantity variability in correlation with the second position information in the updated environment map storage unit,
    determine a moving route using the environment map, and
    cause a vehicle to move along the moving route based on determining the moving route.

11. The environment map updating system according to claim 10, wherein the update target environment map information includes a first state quantity representative value of the position, the first state quantity representative value being correlated with the first position information, and
  the electronic control unit is configured to:
    newly calculate a second state quantity representative value based on the second state quantity for the position;
    update the first state quantity representative value of the update target environment map information by using the second position information and the second state quantity representative value; and
    store the updated first state quantity representative value in correlation with the second position information in the updated environment map storage unit.

12. The environment map updating system according to claim 10, wherein the electronic control unit is configured to:
  newly calculate a variation of a state quantity per unit time for the position; and
  newly calculate a state quantity variability based on the variation of the state quantity per unit time.

13. An environment map updating method comprising:
  preparing update target environment map information, the update target environment map information including first position information indicating a position in a space and a first state quantity variability of the position, the first state quantity variability being correlated with the first position information, the first state quantity variability indicating a first variation tendency of a state quantity of the position with respect to time,
    wherein the state quantity of the position is expressed by a presence probability of an object at the position;
  newly detecting a second position information indicating the position and a second state quantity of the position at different time;
  newly calculating a second state quantity variability by using the second state quantity for the position;
  updating the first state quantity variability of the update target environment map information by using the second position information and the second state quantity variability;
  storing the updated first state quantity variability in correlation with the second position information in an updated environment map storage unit;
  determining a moving route using the environment map; and
  causing a vehicle to move along the moving route based on determining the moving route.

14. The environment map updating method according to claim 13, further comprising:
  newly calculating a second state quantity representative value based on the second state quantity for the position;
  updating a first state quantity representative value of the update target environment map information by using the second position information and the second state quantity representative value, the update target environment map information including the first state quantity representative value, the state quantity representative value being correlated with the first position information; and
  storing the updated first state quantity representative value in correlation with the second position information in the updated environment map storage unit.

15. The environment map updating method according to claim 13, further comprising:
  newly calculating a variation of a state quantity per unit time for the position; and newly calculating a state quantity variability based on the variation of the state quantity per unit time.

* * * * *